United States Patent [19]
Ogawa et al.

[11] Patent Number: 5,787,179
[45] Date of Patent: Jul. 28, 1998

[54] SCRAMBLING AND DESCRAMBLING OF DATA WITH IMPROVED SECURITY

[75] Inventors: Kiyotaka Ogawa; Kiyoshi Kohiyama; Ryota Akiyama; Kiyokatsu Iijima, all of Kawasaki, Japan

[73] Assignee: Fujitsu Ltd., Kawasaki, Japan

[21] Appl. No.: 684,386

[22] Filed: Jul. 19, 1996

[30] Foreign Application Priority Data

Dec. 7, 1995 [JP] Japan .................. 7-319421

[51] Int. Cl.$^6$ ............................................. H04K 1/00
[52] U.S. Cl. ............................................. 380/46; 364/717
[58] Field of Search ............................. 380/46; 364/717

[56] References Cited

U.S. PATENT DOCUMENTS

| | | | |
|---|---|---|---|
| 5,365,272 | 11/1994 | Siracusa | 348/426 |
| 5,440,640 | 8/1995 | Anshel et al. | 380/46 |
| 5,533,128 | 7/1996 | Vobach | 380/46 |

FOREIGN PATENT DOCUMENTS

| | | |
|---|---|---|
| 0 582 122 | 2/1994 | European Pat. Off. |
| 0 641 130 | 3/1995 | European Pat. Off. |
| 95/28795 | 10/1995 | WIPO |

OTHER PUBLICATIONS

*Patent Abstracts of Japan*, vol. 95, No. 7, Aug. 31, 1995 & JP-A-07-111647 (Matsushita Electric Ind. Co. Ltd.), Apr. 25, 1995 * Abstract *.

*Primary Examiner*—David C. Cain
*Attorney, Agent, or Firm*—Staas & Halsey

[57] ABSTRACT

A scrambling method of a stream formed of a series of unit streams in succession, the unit stream including a first stream part and a second stream part located behind the first stream part. The scrambling method scrambles the second stream part by using a random number generator and includes a step of supplying predetermined data included in the first stream part and having a non-fixed value, for each of the second stream part to be scrambled, to the random number generator as an initial value. Further, a scrambling apparatus, a descrambling method and a descrambling apparatus are disclosed.

27 Claims, 13 Drawing Sheets

SCRAMBLING AND DESCRAMBLING OF DATA WITH IMPROVED SECURITY

BACKGROUND OF THE INVENTION

The present invention relates to a scrambling method and apparatus, a descrambling method and apparatus, and a data transmission method and system suitable for transmitting a bit stream (or simply stream) prescribed by the MPEG (Moving Picture Experts Group). The MPEG standard (referred to hereinafter simply as MPEG) is an international standard for digital motion picture encoding (compression) and audio signal encoding, as well as multiplexing and demultiplexing of the same.

FIG. 1 shows a conventional data transmission system.

Referring to FIG. 1, the data transmission system includes a camera 1 for acquiring image data, a microphone 2 for acquiring audio data, and an MPEG encoder 3 that encodes the image data acquired by the camera 1 and the audio data acquired by the microphone 2 to produce a bit stream prescribed by the MPEG by multiplexing the same according to a time-division multiplexing process. The bit stream produced includes a packet header including additional data and a packet data part in which the image data and the audio data are included.

The transmission system of FIG. 1 further includes a scrambling circuit 4 for scrambling the stream output from the MPEG encoder 3 into a scrambled stream. A stream for the packet data part is scrambled in this scrambled stream.

The scrambling circuit 4 includes a random number generator 5 for producing a series of random numbers specified by a key signal and an XOR (exclusive-or) circuit 6. The XOR circuit 6 applies an XOR operation to the packet data part of the stream output from the MPEG encoder 3 and the random numbers output from the random number generator 5.

Further, the scrambling circuit 4 includes a selection circuit 7 for selectively outputting the stream for the packet data part output from the MPEG encoder 3 and the stream output from the XOR circuit 6. The selection circuit 7 outputs the output stream of the scrambling circuit 4 onto a transmission medium 8, which may be a physical medium such as a disk or a tape, or a non-physical medium such as satellite broadcasting or cable television broadcasting.

The system of FIG. 1 further includes a descrambling circuit 9 that descrambles the stream output from the scrambling circuit 4 and transmitted thereto via the transmission medium 8, into a stream in which the packet data part is descrambled.

It will be noted that the descrambling circuit 9 includes a random number generator 10 having a construction identical to the random number generator 5, wherein a key signal identical to the key signal used in the random number generator 5 is supplied also to the random number generator 10.

The descrambling circuit 9 further includes an XOR circuit 11 that applies an XOR operation to the packet data part of the stream output from the scrambling circuit 4 and transmitted via the transmission medium. The XOR circuit 11 also applies an XOR operation to the random numbers output from the random number generator 10.

Further, the descrambling circuit 9 includes a selection circuit 12 that selectively outputs one of the packet headers of the stream output from the scrambling circuit 4 and transmitted via the transmission medium 8, and the output stream of the XOR circuit 11.

The output stream of the descrambling circuit 9 is supplied to an MPEG decoder 13 that separates the image data and the audio data from the stream output from the descrambling circuit 9. The descrambled image data and audio data are supplied to a television receiver 14.

By using the data transmission system of FIG. 1 in which the packet data part of the MPEG stream is scrambled during the transmission, it is possible to protect the packet data from being copied illegally.

The system of FIG. 1, however, causes a problem in the case of FIG. 2, in which a data stream including data a1, a2, a3, ... is output from the MPEG encoder 3 and simultaneously random numbers c1, c2, c3, ... are output from the random number generators 5 and 10. In such a case, the XOR circuit 6 produces an output as a1⊕c1, a2⊕c2, a3⊕c3, ...

wherein the foregoing output is selected by the selection circuit 7 and is output to the XOR circuit 11. Thereby, the XOR circuit 11 produces the stream including the data a1, a2, a3, ...

In such a case, it is possible to recover the random numbers c1, c2, c3, ... by merely applying an XOR operation a1⊕c1, a2⊕c2, a3⊕c3, ...

to the stream inputted into the XOR circuit 11 and the data stream a1, a2, a3, ... output from the XOR circuit 11 by using another XOR circuit 15.

This means that the data transmission system of FIG. 1 is vulnerable to illegal copying of the random numbers output from the random number generator 10, even when the key signal is kept secret. As a result, the scrambled packet data is also easily descrambled.

SUMMARY OF THE INVENTION

Accordingly, it is a general object of the present invention to provide a novel and useful data transmission system and method wherein the foregoing problems are eliminated.

Another and more specific object of the present invention is to provide a scrambling method and apparatus, a descrambling method and apparatus, as well as a data transmission method and system wherein the security of data transmission is substantially improved.

Another object of the present invention is to provide a scrambling method applied to a stream including a series of unit streams in succession, the unit stream including a first stream part and a second stream part located behind the first stream part. The scrambling method scrambles the second stream part using a random number generator, the scrambling method comprising a step of:

supplying predetermined data included in the first stream part and having a non-fixed value, for each second stream part to be scrambled, to the random number generator as an initial value.

When using the scrambling method of the present invention, the descrambling is made by supplying predetermined data included in the first stream part and having a non-fixed value, to a random number generator of a descrambling apparatus as an initial value.

According to such a process, the random number generator in the descrambling side is supplied with a non-fixed initial value for each of the second stream parts to be scrambled. Thereby, an analysis of the random number pattern generated by the random number generator becomes substantially difficult, and the security of data transmission is improved substantially.

Another object of the present invention is to provide a scrambling apparatus supplied with a stream including a series of unit streams in succession. The unit stream includes a first stream part and a second stream part behind the first stream part. The scrambling apparatus scrambles the second stream part, and comprises:

> a random number generator generating random numbers;
> 
> an initial value supplying circuit supplies, for each of the second stream part to be scrambled, predetermined non-fixed data included in the first stream part to the random number generator as an initial value; and
> 
> a logic operation circuit applies a logic operation to the second stream part to be scrambled and the random numbers generated by the random number generator, for scrambling the second stream part.

When using the scrambling apparatus of the present invention, a descrambling apparatus which includes a random number generator for generating random numbers, an initial value supplying circuit supplying predetermined data included in the first stream part and having a non-fixed value to the random number generator as an initial value, and a logic operation circuit descrambling the scrambled second stream part by applying a logic operation to the scrambled second stream part and the random numbers generated by the random number generator, is used.

According to the present invention, the random generator in the descrambling side is supplied with a non-fixed initial value for each second stream part to be scrambled. Thereby, an analysis of the random number pattern generated by the random number generator becomes substantially difficult, and the security of data transmission is improved substantially.

Another object of the present invention is to provide a descrambling method of a stream that includes a series of unit streams in succession. The unit stream include a first stream part and a second stream part located behind the first stream part. The descrambling method descrambling the second stream part by using a random number generator. The descrambling method comprises a step of:

> supplying, for each second stream part to be descrambled, predetermined non-fixed data included in the first stream part to the random number generator as an initial value, for descrambling the second stream part.

According to the present invention, it should be noted that the random number generator of the descrambling apparatus is supplied with a nonfixed initial value for the scrambled second stream part. Thereby, an analysis of the random number pattern generated by the random number generator becomes substantially difficult, and the security of data transmission is improved substantially.

Another object of the present invention is to provide a descrambling apparatus supplied with a stream including a first stream part and a second stream part behind the first stream part. The descrambling apparatus comprises:

> a random number generator generating random numbers;
> 
> an initial value supplying circuit supplying, for each second stream part to be descrambled, predetermined non-fixed data included in the first stream part, to the random number generator as an initial value; and
> 
> a logic operation circuit applying a logic operation to the second stream part to be descrambled and the random numbers generated by the random number generator, to descramble the second stream part.

According to the present invention, it should be noted that the random number generator of the descrambling apparatus is supplied with a nonfixed initial value for each scrambled second stream part. Thereby, an analysis of the random number pattern generated by the random number generator becomes substantially difficult, and the security of data transmission is improved substantially.

Another object of the present invention is to provide a data transmission method, including the steps of:

> applying a scrambling method to a stream including a series of unit streams in succession, the unit stream including a first stream part and a second stream part located behind the first stream part, the scrambling method including a step of supplying predetermined data included in the first stream part and having a non-fixed value, for each second stream part to be scrambled, to the random number generator as an initial value;
> 
> transmitting the stream scrambled in the scrambling step via a medium to a destination; and
> 
> applying a descrambling method, in the destination, to the stream transmitted via the medium, the method comprising a step of supplying, for each second stream part to be descrambled, predetermined non-fixed data included in the first stream part to the random number generator as an initial value, for descrambling the second stream part.

According to the data transmission method of the present invention, the random number generator of the scrambling apparatus as well as the random number generator of the descrambling apparatus, are supplied with a non-fixed initial value for each scrambled second stream part. Thereby, an analysis of the random number pattern generated by the random number generator becomes substantially difficult, and the security of data transmission is improved substantially.

Another object of the present invention is to provide a data transmission system for transmitting a stream including a series of unit streams in succession, the unit stream including a first stream part and a second stream part located behind the first stream part, said data transmission system comprising:

> a transmission source including a scrambling apparatus, the scrambling apparatus comprising: a random number generator generating random numbers; an initial value supplying circuit supplying, for each second stream part to be scrambled, predetermined nonfixed data included in the first stream part to the random number generator as an initial value; and a logic operation circuit applying a logic operation to the second stream part to be scrambled and the random numbers generated by the random number generator, for scrambling the second stream part, the transmission source supplying a scrambled stream produced by the scrambling apparatus upon a medium; and
> 
> a destination including a descrambling apparatus descrambling the scrambled stream supplied via the medium, the descrambling apparatus comprising: a random number generator generating random numbers; an initial value supplying circuit supplying, for each scrambled second stream part to be descrambled, the scrambled second stream part being included in the scrambled stream supplied via the medium, predetermined non-fixed data included in the first stream part of the scrambled stream supplied via the medium, to the random number generator as an initial value; and a logic operation circuit applying a logic operation to the scrambled second stream part and the random numbers generated by the random number generator, to descramble the second stream part.

According to the data transmission system of the present invention, the random number generator of the scrambling apparatus as well as the random number generator of the descrambling apparatus, are supplied with a non-fixed initial value for each scrambled second stream part. Thereby, an analysis of the random number pattern generated by the random number generator becomes substantially difficult, and the security of data transmission is improved substantially.

Other objects and further features of the present invention will become apparent from the following detailed description when read in conjunction with the attached drawings.

DETAILED DESCRIPTION OF THE PREFERRED EMBODIMENTS

[First Embodiment]

Figure 1:
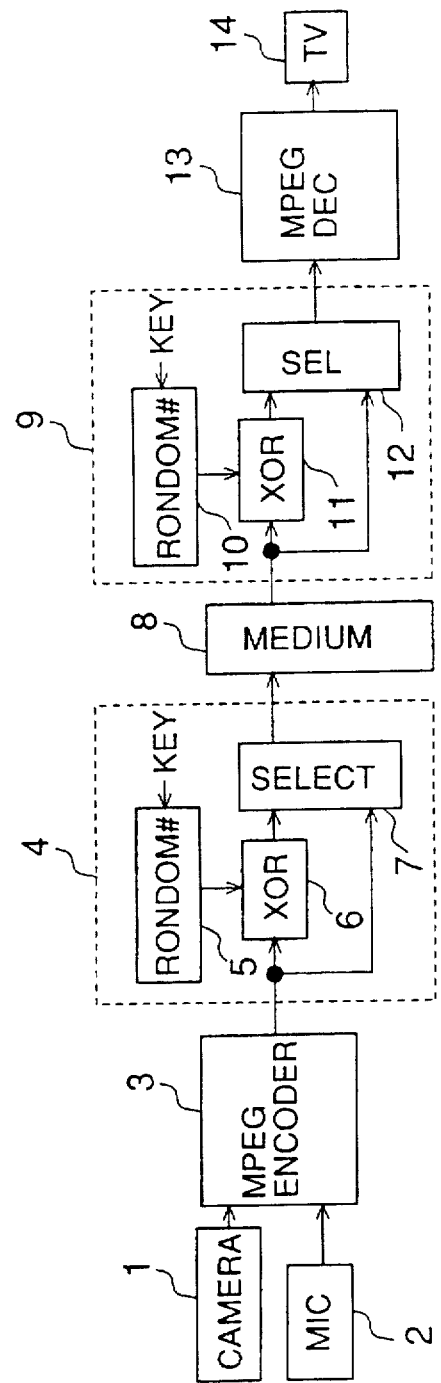
FIG. 1 is a diagram showing a construction of a conventional data transmission system.
Figure 2:
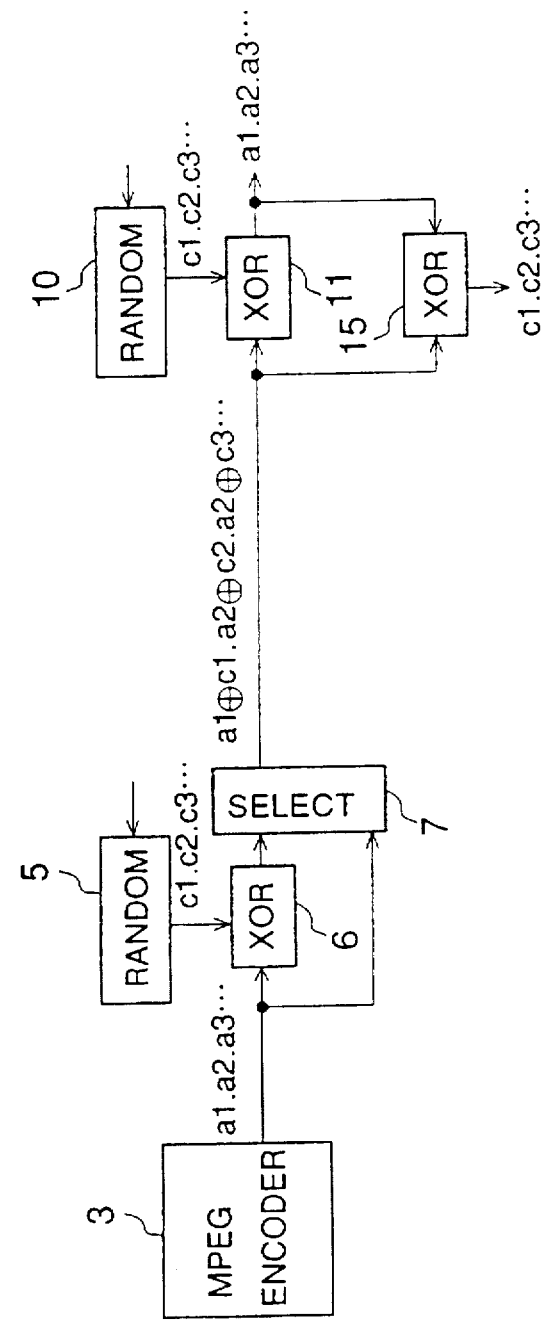
FIG. 2 is a diagram showing an operation of the conventional data transmission system of FIG. 1.
Figure 3:
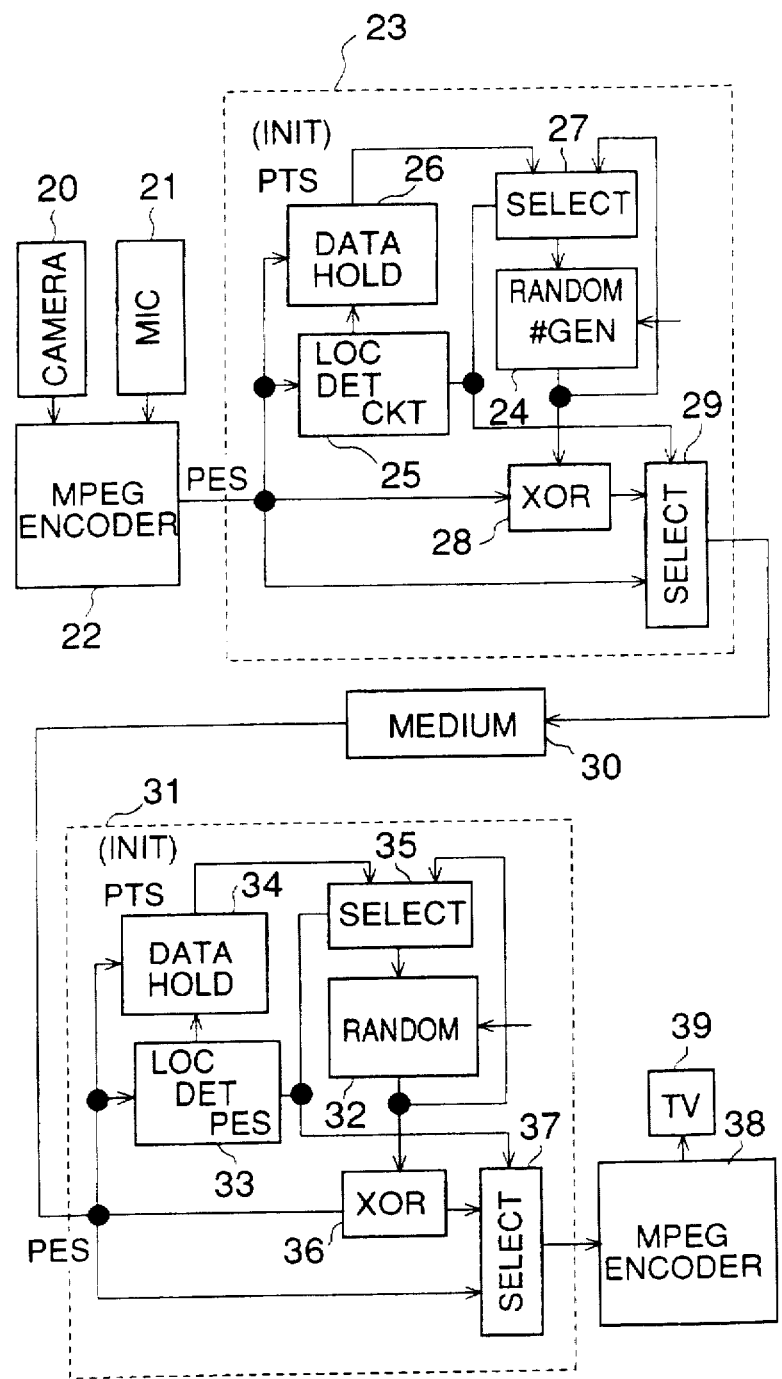
FIG. 3 is a diagram showing a construction of a data transmission system according to a first embodiment of the present invention.

FIG. 3 shows a construction of a data transmission system according to a first embodiment of the present invention.

Referring to FIG. 3, the system includes a camera 20 for acquiring image data, a microphone 21 for acquiring audio data, and an MPEG encoder 22 that encodes the image data acquired by the camera 20 and the audio data acquired by the microphone 21 to produce a bit stream prescribed by MPEG2-PS (program stream), by multiplexing the same according to a time-division multiplexing technique.

Figure 4:
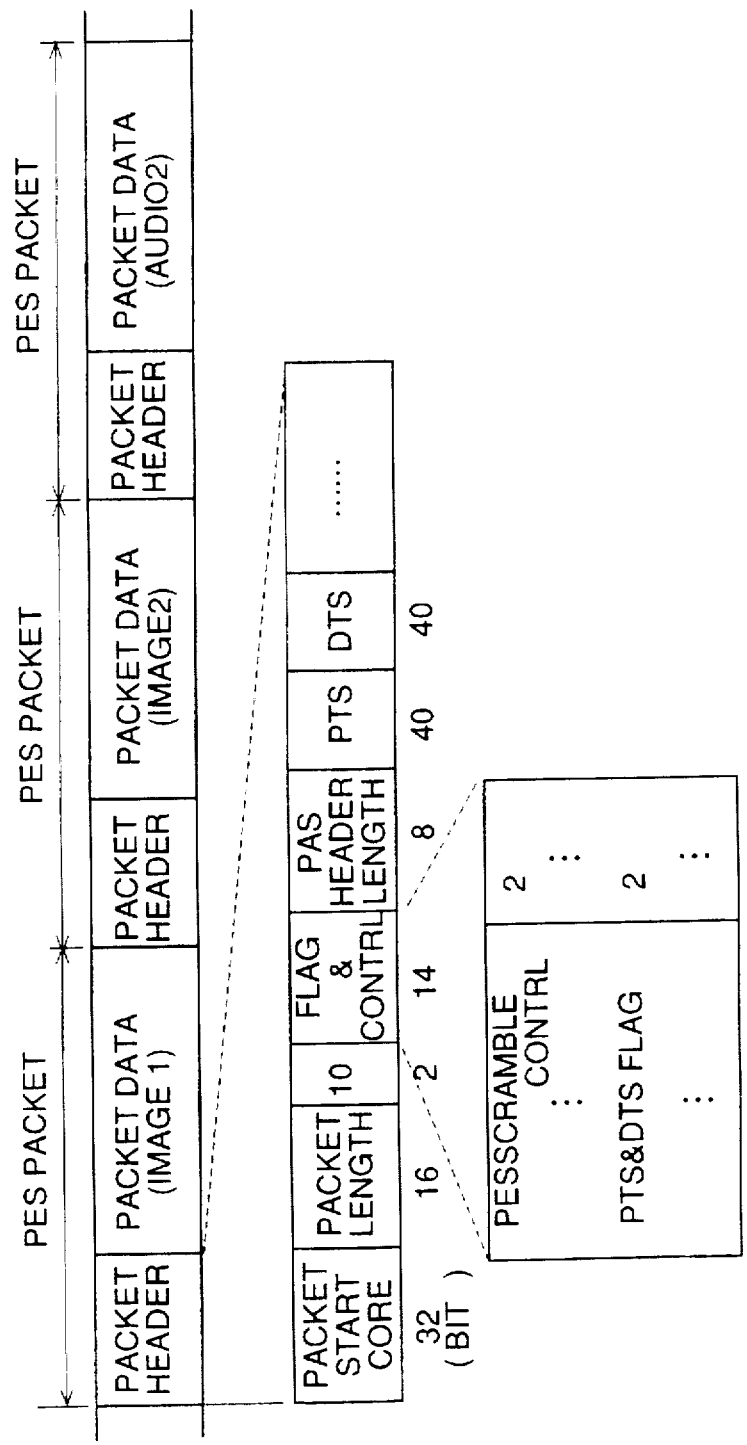
FIG. 4 is a diagram explaining a structure of a PES packet used in MPEG2-PS.

FIG. 4 shows the structure of a PES (Packetized Elementary Stream) packet prescribed by MPEG2-PS.

Referring to FIG. 4, the PES packet includes a series of PES packets each including a packet header and packet data, wherein the packet header includes a packet start code of 32 bits, a packet length code of 16 bits, a 2-bit code designated by "10," a 14-bit code for flag and control, a PES header length code of 8 bits, and 40-bit codes for PTS and DTS data. The packet data, on the other hand, may contain image data or audio data.

In FIG. 4, the PTS (Presentation Time Stamp) data represents the time management information for reproduced output and is inserted every 700 ms. On the other hand, the DTS (Decoding Time Stamp) is the time management information for decoding. Further, the two-bit code represented as "PES scramble control" in the 14 bit field for "flag and control" is data representing the existence or non-existence of scramble control, while a PTS & DTS flag is a flag representing the existence or non-existence of the PTS data.

Referring back to FIG. 3, the system further includes a scrambling circuit 23 that scrambles the output stream of the MPEG encoder 22, by scrambling the stream of the packet data.

The scrambling circuit 23 includes a random number generator 24 and a location detection circuit 25, wherein the random number generator 24 is a random number generator of the DES (Data Encryption Standard) type and produces a series of random numbers specified by a key signal. On the other hand, the location detection circuit 25 is supplied with the output stream of the MPEG encoder 22 and carries out various operations such as detection of a packet start code, confirmation of the content of the PES scramble control, confirmation of the PTS & DTS flag, location detection of the PTS, detection of the starting location of the packet data, and the like.

The scrambling circuit 23 further includes a data hold circuit 26 for holding the PTS data, wherein the data hold circuit 26 is controlled, when the location detection circuit 25 detects the location of the PTS, so as to hold the PTS data, of which the location is thus detected.

The scrambling circuit 23 further includes a selection circuit 27 that selectively supplies either the PTS data held by the data hold circuit 26 or random numbers generated by the random number generator 24, to the random number generator 24 itself. Thus, the selection circuit 27 thereby supplies the PTS data held in the data hold circuit 26 to the random number generator 24 as the initial value when the location detection circuit 25 detects the start location of the packet data to be scrambled. Thereafter, the selection circuit 27 is controlled by the location detection circuit 25, until the stream of the packet data is completed, such that the random numbers generated by the random number generator 24 are fed back to the random number generator 24.

It should be noted that the location detection circuit 25, the data hold circuit 26 and the selection circuit 27 together form an initial value supplying circuit in the scrambling circuit 23.

The scrambling circuit 23 further includes an XOR circuit 28 that applies an XOR operation to the output stream of the MPEG encoder 22, for the part of the packet data which is subjected to the scrambling, and further to the random numbers output by the random number generator 24. As a result of the XOR operation, the stream for the packet data is scrambled.

Further, the scrambling circuit 23 includes a selection circuit 29 that selectively outputs the output stream of the MPEG encoder 22 and the output stream of the XOR circuit 28. The selection circuit 29 is controlled by the location detection circuit 25 such that a scrambled stream is output. In the scrambled stream, the packet data of the stream output by the MPEG encoder 22 is scrambled.

The output stream of the selection circuit 29 is supplied to a medium 30, which may be a disk, wherein the medium stores the output stream of the scrambling circuit 23. The output stream of the scrambling circuit 23 thus stored in the medium 30 is then descrambled by a descrambling circuit 31. More specifically, the descrambling circuit 31 converts the stream read out from the medium 30 to a stream in which the scrambled packet data in the scrambled stream is descrambled.

The descrambling circuit 31 also forms a part of the first embodiment of the present invention.

It should be noted that the descrambling circuit 31 includes a random number generator 32 identical to the random number generator 24 and uses the same key signal used in the random number generator 24.

The descrambling circuit 31 further includes a location detection circuit 33, wherein the location detection circuit 33 is supplied with the output stream of the scrambling circuit 23 via the medium 30 and carries out various operations such as detection of a packet start code, confirmation of the content of the PES scramble control, confirmation of the PTS & DTS flag, location detection of the PTS, detection of the starting location of the packet data, and the like.

The descrambling circuit 31 further includes a data hold circuit 34 for holding the PTS data, wherein the data hold circuit 34 is controlled, when the location detection circuit 33 detects the location of the PTS, so as to hold the PTS data, of which the location is thus detected.

The descrambling circuit 31 further includes a selection circuit 35 that selectively supplies either the PTS data held by the data hold circuit 34 or random numbers generated by the random number generator 32, to the random number generator 32 itself. Thus, the selection circuit 35 thereby supplies the PTS data held in the data hold circuit 34 to the random number generator 32 as the initial value when the location detection circuit 33 detects the start location of the packet data to be descrambled. Thereafter, the selection circuit 35 is controlled by the location detection circuit 33, until the stream of the packet data is completed, such that the random numbers generated by the random number generator 32 are fed back to the random number generator 32.

It should be noted that the location detection circuit 33, the data hold circuit 34 and the selection circuit 35 together form an initial value supplying circuit of the descrambling circuit 31.

The descrambling circuit 31 further includes an XOR circuit 36 that applies an XOR operation to the stream supplied from the medium 30 for the part of the packet data, which is subjected to the scrambling, and further to the random numbers output by the random number generator 32. As a result of the XOR operation, the stream for the packet data is descrambled.

Further, the descrambling circuit 31 includes a selection circuit 37 that selectively outputs the stream supplied via the medium 30 or the output stream of the XOR circuit 36. The selection circuit 37 is controlled by the location detection circuit 33 such that a descrambled stream is output. In the descrambled stream, the packet data of the stream supplied from the medium 30 is descrambled.

The stream thus descrambled by the descrambling circuit 31 and output from the selection circuit 37 is supplied to an MPEG decoder 38 for separation and decoding of the stream for the image data and the stream for the audio data, wherein the image data and the audio data thus decoded are supplied to a television receiver 39.

Summarizing the above, the image data acquired by the camera 20 and the audio data acquired by the microphone 21 are encoded by the MPEG encoder 22 in the form of a stream prescribed by the MPEG2-PS, wherein the stream thus produced is supplied to the scrambling circuit 23. In the scrambling circuit 23, the stream is supplied to the location detection circuit 25, the data hold circuit 26, the XOR circuit 28 and the selection circuit 29.

Figure 5:
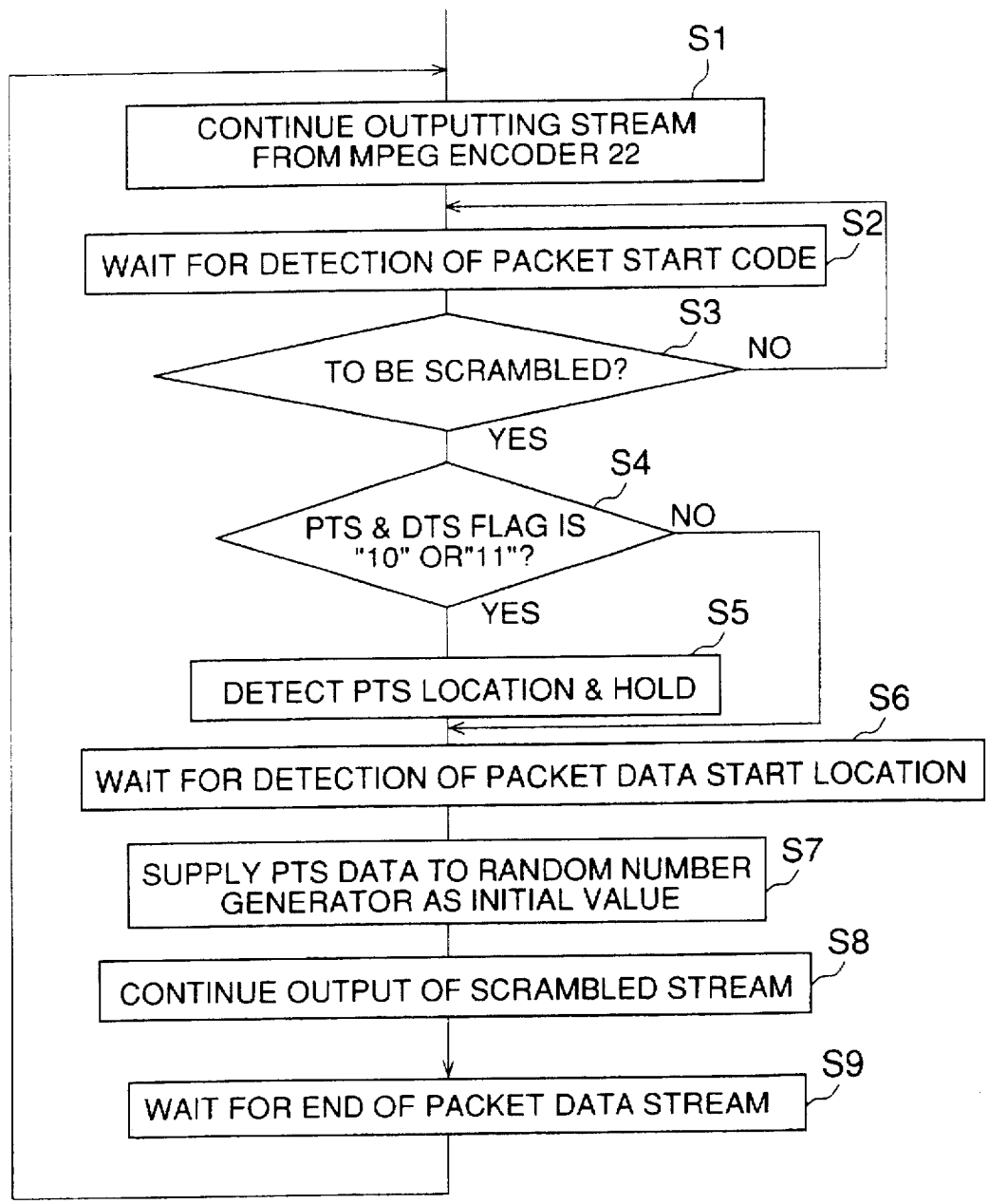
FIG. 5 is a flowchart explaining an operation of a scrambling circuit used in the data transmission system of FIG. 3.

FIG. 5 is a flowchart showing the operation of the scrambling circuit 23 according to the first embodiment of the present invention. In the scrambling circuit 23, the same operation is repeated a number of times. Thus, the description hereinafter will be made starting from the state in which the selection circuit 29 has finished outputting the stream for the packet data to be scrambled.

Referring to FIG. 5, the location detection circuit 25 controls the selection circuit 29 such that the stream supplied from the MPEG encoder 22 is continuously output (step S1). After this, the scrambling circuit 23 changes the state thereof and waits for the incoming of the packet start code (step S2).

The location detection circuit 25, in turn, discriminates whether or not the stream for the packet data is subjected to scrambling, based upon the content of the scramble control information described in the packet header, when the packet start code is detected (step S3). When the pertinent stream is not the subject of scrambling, the operation returns to the step S2 and the location detection circuit 25 waits for the next incoming of the packet start code.

When the stream for the packet data is the subject of scrambling ("YES" in the step S3), the location detection circuit 25 discriminates whether the PTS & DTS flag in the packet header part is "10" or "11" (step S4). In other words, existence of the PTS data is checked in this step.

When it is confirmed that the PTS & DTS flag is "10" or "11," in other words, when it is confirmed that the PTS data exists, the location detection circuit 25 detects the location of the PTS and causes the data hold circuit 26 to hold the PTS data (step S5). After this, the location detection circuit 25 waits for the detection of the start location of the packet data (step S6).

On the contrary, when the PTS & DTS flag is other than "10" or "11," in other words, when there is no PTS data existing, the location detection circuit 25 waits for the detection of the start location of the packet data (step S6).

The location detection circuit 25, upon detection of the start location of the packet data, controls the selection circuit 27, such that the PTS data held by the data hold circuit 26 is supplied to the random number generator 24 as the initial value. When there is no PTS data existing in the packet header of the packet data to be scrambled, the PTS data in the packet data immediately before the packet data to be scrambled, is supplied to the random number generator as the initial value (step S7). When the PTS data is not included in the packet data thus selected, a further previous packet data is selected, until the packet data including the PTS data is encountered.

Thus, the XOR circuit 28 applies an XOR operation to the output stream of the MPEG encoder 22 for the part of the stream having the packet data to be scrambled and the random numbers output from the random number generator 24. Thereby, the scrambling is achieved for the stream that includes the packet data that is to be scrambled.

Thus, the location detection circuit 25 controls the selection circuit 29 such that the scrambled output stream of the XOR circuit 28 is output continuously (step S8), until the stream for the packet data is finished (step S9). After this, the process returns to the step S1.

The output stream of the MPEG encoder 22 is thus converted to a scrambled stream in which the stream for the packet data is scrambled. The scrambled stream is then stored in the storage medium 30, wherein the stream thus stored in the medium 30 is supplied to the descrambling circuit 31 as necessary.

Figure 6:
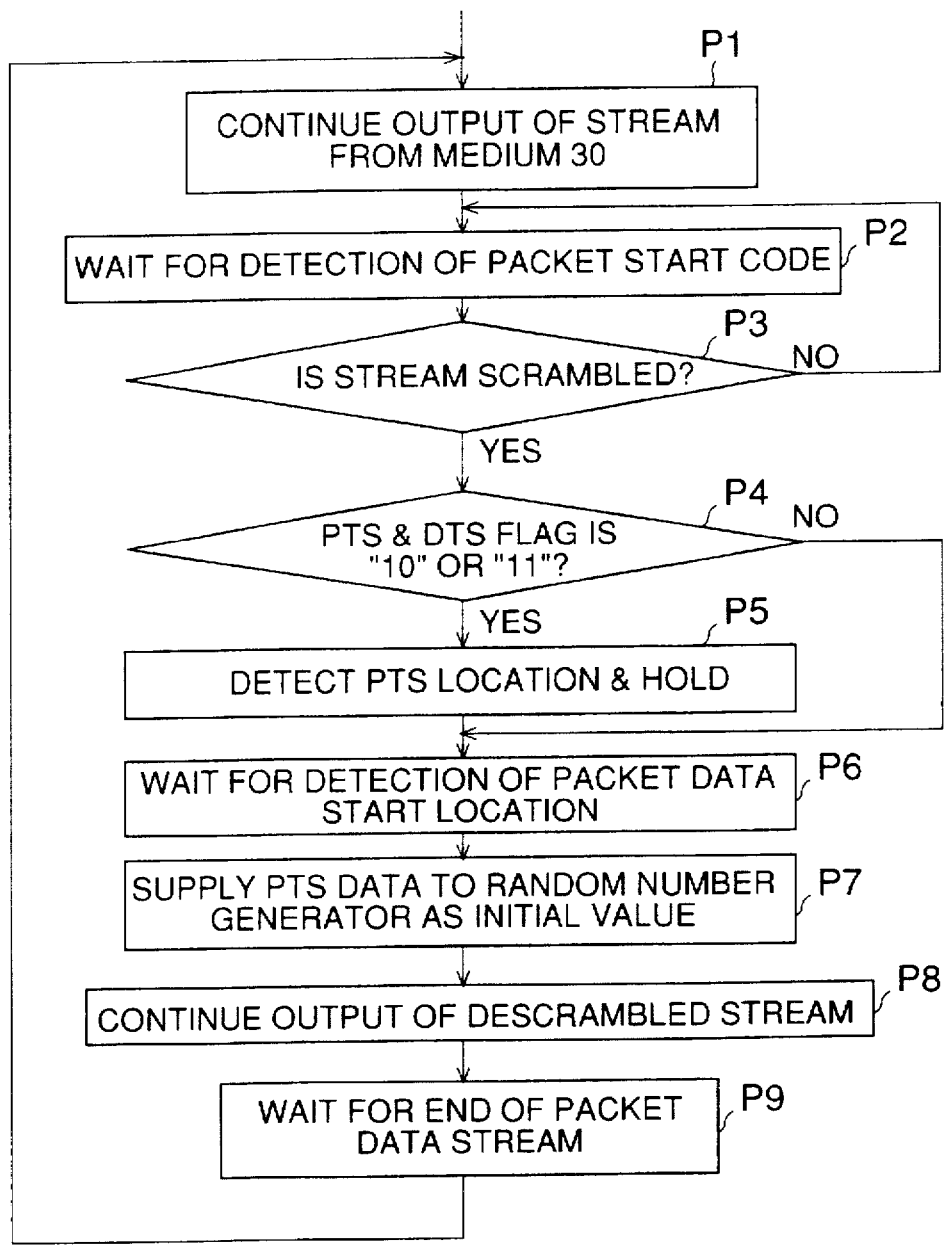
FIG. 6 is a flowchart explaining an operation of a descrambling circuit used in the data transmission system of FIG. 3.

FIG. 6 is a flowchart showing the operation of the descrambling circuit 31 according to the first embodiment of the present invention. In the descrambling circuit 31, the same operation is repeated a number of times. Thus, the description hereinafter will be made starting from the state in which the selection circuit 37 has finished outputting the stream for the packet data to be descrambled.

Referring to FIG. 6, the location detection circuit 33 controls the selection circuit 37 such that the stream supplied from the medium 30 is continuously output (step P1). After this, the descrambling circuit 31 changes the state thereof and waits for the incoming of the packet start code (step P2).

The location detection circuit 33 discriminates whether the stream for the packet data is to be descrambled, based upon the content of the scramble control information described in the packet header part, when the packet start code is detected (step P3). When the pertinent stream is not scrambled, the operation returns to the step P2 and the location detection circuit 33 waits for the next incoming of the packet start code.

When the stream for the packet data is scrambled and has to be descrambled ("YES" in step P3), the location detection circuit 33 discriminates whether the PTS & DTS flag in the packet header part is "10" or "11" (step P4). In other words, existence of the PTS data is checked in this step.

When it is confirmed that the PTS & DTS flag is "10" or "11," in other words, when it is confirmed that the PTS data exists, the location detection circuit 33 detects the location of the PTS and causes the data hold circuit 34 to hold the PTS data (step P5). After this, the descrambling circuit 31 waits for the detection of the start location of the packet data (step P6).

On the contrary, when the PTS & DTS flag is other than "10" or "11," in other words when there is no PTS data existing, the location detection circuit 33 waites for the detection of the start location of the packet data (step P6).

The location detection circuit 33, upon detection of the start location of the packet data, controls the selection circuit 35, such that the PTS data held by the data hold circuit 34 is supplied to the random number generator 32 as the initial value. When there is no PTS data existing in the packet header of the packet data to be descrambled, the PTS data in the packet data immediately before the packet data to be descrambled, is supplied to the random number generator 32 as the initial value (step P7). When there is no PTS data again in the packet header of the packet data, a further previous packet data is selected, until a packet data including the PTS data is encountered.

Thus, the XOR circuit 36 applies an XOR operation to the output stream of the medium 30 for the part of the stream having the packet data to be descrambled and the random numbers output from the random number generator 32. Thereby, the descrambling is achieved for the stream that includes the packet data that is to be descrambled.

Thus, the location detection circuit 33 controls the selection circuit 37 such that the descrambled output stream of the XOR circuit 36 is output continuously (step P8), until the stream for the packet data is finished (step P9). After this, the process returns to step P1.

Thus, the stream supplied from the medium 30 is converted to a descrambled stream in which the stream for the packet data is descrambled. The descrambled stream is then transmitted to the MPEG decoder 38.

In the MPEG decoder 38, a stream for the image data and a stream for the audio data are separated from the stream supplied from the descrambling circuit 31, wherein the image data stream and the audio data stream thus separated are further decoded by the MPEG decoder 38. The image data and the audio data thus decoded by the MPEG decoder 38 are then transmitted to the television receiver 39.

Thus, according to the first embodiment of the present invention, the output stream of the MPEG encoder 22 in the MPEG2-PS-prescribed format is converted to a scrambled stream by the scrambling circuit 23 such that the stream for the packet data to be scrambled is scrambled. The scrambled stream is then supplied to the descrambling circuit 31 via the medium 30, wherein the descrambling circuit 31 transmits the stream to the MPEG decoder 38 after descrambling.

Here, it should be noted that the scrambling circuit 23 supplies, for each packet data to be scrambled, the PTS data included in the packet header to be scrambled, to the random number generator 24 as the initial value. When there is no PTS data existing in the packet header of the packet data to be scrambled, the PTS data in the packet data immediately before the packet data to be scrambled, is supplied to the random number generator 24 as the initial value. When there is no PTS data again in the packet header of the packet data thus selected, a further previous packet data is selected, until a packet data including the PTS data is encountered.

In conformity to the foregoing, the descrambling circuit 31 carries out the descrambling by supplying, for each packet data to be descrambled, the PTS data included in the packet header to be descrambled, to the random number generator 32 as the initial value. When there is no PTS data existing in the packet header of the packet data to be descrambled, the PTS data in the packet data immediately before the packet data to be descrambled, is supplied to the random number generator 32 as the initial value. When there is no PTS data again in the packet header of the packet data thus selected, a further previous packet data is selected, until a packet data including the PTS data is encountered.

According to the data transmission method and system of the first embodiment of the present invention, the random number generator 32 of the descrambling circuit 31 is supplied, for each scrambled stream for the packet data, with the PTS data in which the data value is not constant or fixed. Thereby, the analysis of the random number pattern generated by the random number generator 32 becomes substantially difficult, and the security of the data transmission is improved substantially.

[Second Embodiment]

Figure 7:
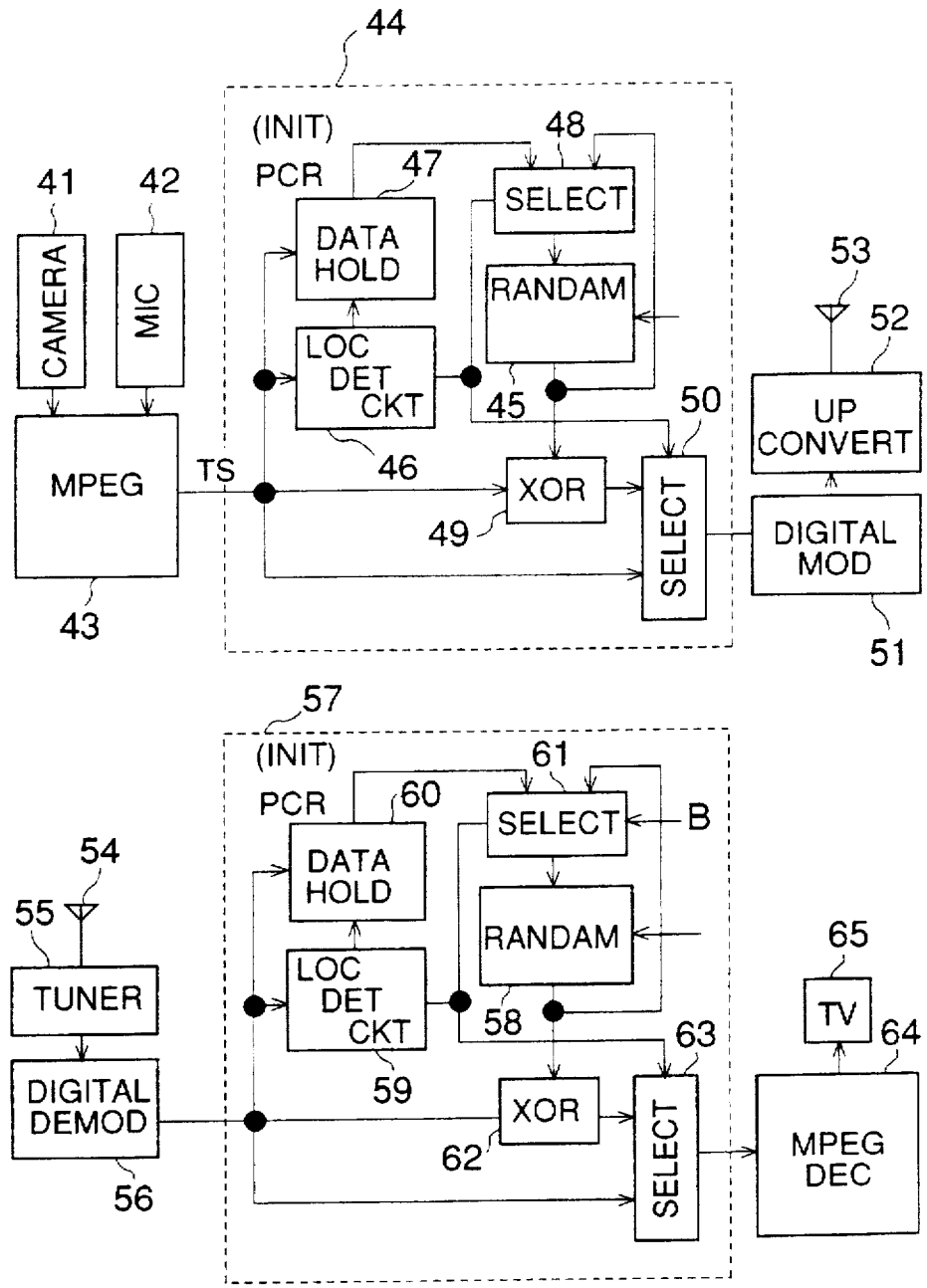
FIG. 7 is a diagram showing a construction of a data transmission system according to a second embodiment of the present invention.

FIG. 7 shows a construction of the data transmission system according to a second embodiment of the present invention.

Referring to FIG. 7, the data transmission system includes a camera 41 for acquiring image data, a microphone 42 for acquiring audio data, and an MPEG encoder 43 encoding the image data thus acquired by the camera 41 and the audio data thus acquired by the microphone 42 and further multiplexing the same by a time-divisional multiplexing technique, to produce a stream prescribed by MPEG2-TS (transport stream).

Figure 8:
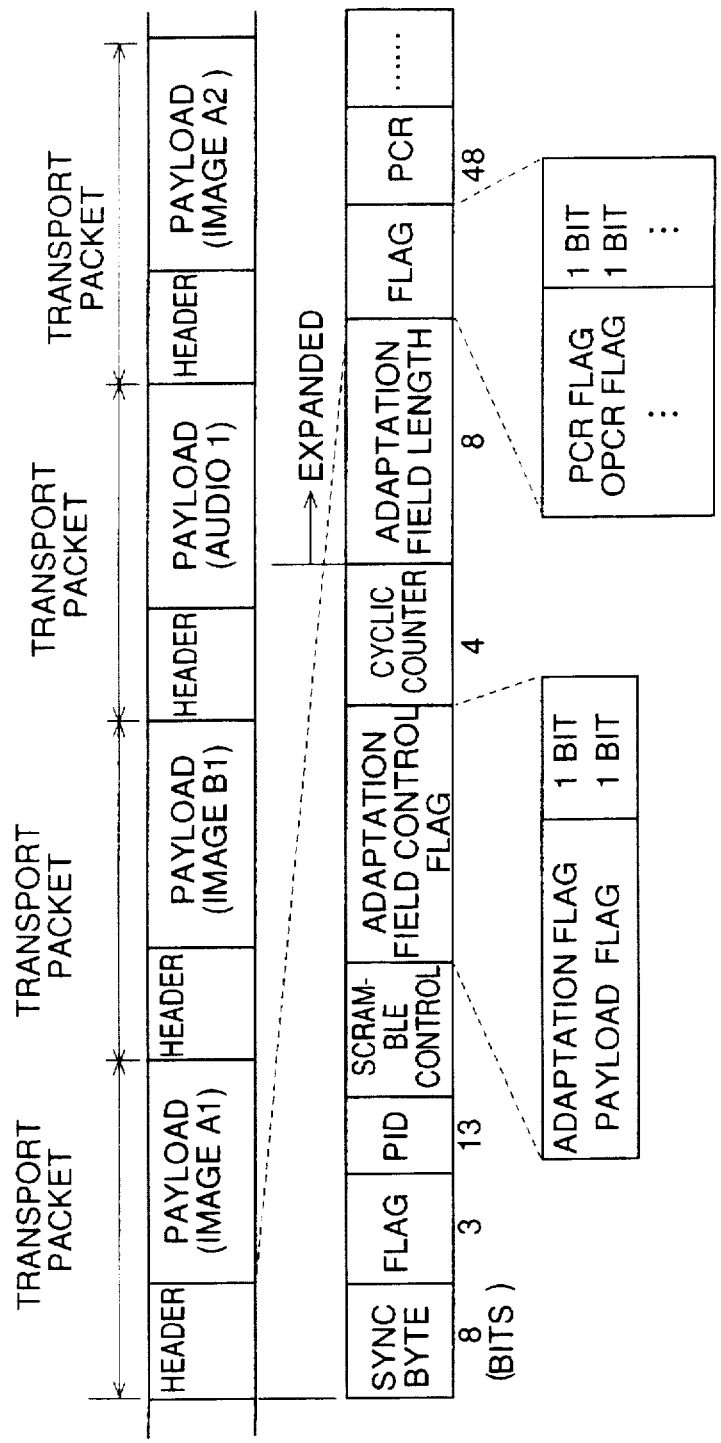
FIG. 8 is a diagram explaining a structure of a transport packet used in MPEG2-TS.

FIG. 8 shows the structure of the transport packet prescribed by the MPEG2-TS.

Referring to FIG. 8, the transport packet includes a header and a payload, wherein the header includes 8-bit field for a synchronization code, a 3-bit field for a flag, a 13-bit field for PID, a field for a scrambling control code, a field for an adaptation field control flag, a field for a cyclic counter of 4 bits, and a field for an adaptation field length code of 8 bits, wherein the adaptation field control flag may include an adaptation flag of 1 bit or a payload flag of 1 bit. The adaptation flag indicate the existence of an adaptation field, while the payload flag indicates existence of a payload.

The payload, on the other hand, carries image data such as A1, B1, A2, ... or audio data and includes a 1 bit field for a flag such as a PCR flag or an OPCR flag, and a 48-bit field for PCR (Program Clock Reference) data, wherein the PCR data is used for resetting an STC signal, a synchronization signal used as a time reference, to a value specified by the MPEG encoder 43. The PCR data is inserted generally every 100 ms. Further, the PCR flag indicates whether or not the PCR exists.

Referring back to FIG. 7, the data transmission system includes a scrambling circuit 44 that converts the output stream of the MPEG encoder 43 to a scrambled stream in which the stream for the payload is scrambled.

The scrambling circuit 44 includes a random number generator 45 of the DES type that generates a series of random numbers specified by the key signal, and a location detection circuit 46 that carries out various operations such as detection of the synchronization byte or code included in the output stream of the MPEG encoder 43, confirmation of the content of the adaptation flag, confirmation of the content of the payload flag, confirmation of the content of the PCR flag, detection of the PCR location, and detection of start location of the payload.

Further, the transmission system includes a data hold circuit 47 for holding the PCR data, wherein the data hold circuit 47 is controlled by the location detection circuit 46, upon detection of the location of the PCR by the location detection circuit 46, so as to hold the PCR data of which the location is thus detected.

Further, the transmission system includes a selection circuit 48 that selectively supplies either the PCR data held by the data hold circuit 47 or the random numbers generated by the random number generator 45, to the random number generator 45 itself. It should be noted that the selection circuit 48 supplies, upon the detection of the start location of the payload to be scrambled by the location detection circuit 46, the PCR data held by the data hold circuit 47 to the random number generator 45 as an initial value. Thereafter, the selection circuit 48 is controlled by the location detection circuit 46 such that the random numbers output from the random number generator 45 are fed back to the random number generator 45, until the output of the stream for the payload is finished.

The location detection circuit 46, the data hold circuit 47, and the selection circuit 48 together form an initial value supplying circuit of the scrambling circuit 44.

Further, the transmission system includes an XOR circuit 49 that applies an XOR operation to the output stream of the MPEG encoder 43, for the part corresponding to the payload that is to be scrambled, and further to the random numbers output from the random number generator 45. Thereby, the XOR circuit 49 scrambles the stream for the payload.

The transmission system further includes a selection circuit 50 that selectively outputs either the stream output from the MPEG encoder 43 and the stream output from the XOR circuit 49, wherein the selection circuit 50 is controlled by the location detection circuit 46 such that the selection circuit 50 outputs a scrambled stream in which the stream for the payload output from the MPEG encoder 43 is scrambled.

Further, the transmission system includes a digital modulator 51 for digitally modulating the output stream of the selection circuit 50 and hence the output of the scrambling circuit 44, an up-converter 52 for transmitting the output of the digital modulator 51, and a transmission antenna 53.

The transmission system of FIG. 7 further includes a reception antenna 54 and a tuner 55 for tuning, and a digital demodulator 56 for digitally demodulating the tuner 55.

The transmission system further includes a descrambling circuit 57 that descrambles the scrambled stream output from the digital demodulator 56 such that the scrambled stream for the payload is descrambled.

The descrambling circuit 57, in turn, includes a random number generator 58 having a construction identical to the random number generator 45 and supplied with a key signal identical to the key signal used in the random number generator 45.

The descrambling circuit 57 further includes a location detection circuit 59 that carries out various operations such as detection of the synchronization byte or code included in the stream output from the digital demodulator 56, confirmation of the content of the adaptation flag, confirmation of the content of the payload flag, confirmation of the content of the PCR flag, detection of the PCR location, and detection of the start location of the payload.

Further, the descrambling circuit 57 includes a data hold circuit 60 for holding the PCR data, wherein the data hold circuit 60 is controlled by the location detection circuit 59, when the location detection circuit 59 has detected the location of the PCR, such that the data hold circuit 60 holds the PCR data thus detected.

The descrambling circuit 57 further includes a selection circuit 61 for selectively supplying either the PCR data held by the data hold circuit 60 or the random numbers generated by the random number generator 58, wherein the selection circuit 61 supplies the PCR data held by the data hold circuit 60 to the random number generator 58 as the initial value when the location detection circuit 59 has detected the location of the payload that is scrambled. Thereafter, the selection circuit 61 is controlled by the location detection circuit 59 such that the random numbers output from the random number generator 58 are fed back to the random number generator 58.

It should be noted that the location detection circuit 59, the data hold circuit 60 and the selection circuit 61 together form an initial value supplying circuit of the descrambling circuit 57.

Further, the descrambling circuit 57 includes an XOR circuit 62 that applies an XOR operation to the scrambled stream for the payload supplied from the digital demodulator 56 and the random numbers output by the random number generator 58, wherein the XOR circuit 62 descrambles the scrambled stream as a result of the XOR operation.

The descrambling circuit 57 further includes a selection circuit 63 selectively outputting either the stream output from the digital demodulator 56 or the stream output from the XOR circuit 62, wherein the selection circuit 63 is controlled by the location detection circuit 59 such that the selection circuit 63 outputs the descrambled stream in which the scrambled stream for the payload output from the digital demodulator 56 is descrambled.

The output stream of the descrambling circuit 57 output from the selection circuit 63 is then supplied to an MPEG decoder 64 for separation and decoding of the image data stream and the audio data stream, and the image data and the audio data thus separated and demodulated are supplied to a television receiver 65.

In the data transmission system, it should be noted that the image data acquired by the camera 41 and the audio data acquired by the microphone 42 are encoded by the MPEG encoder 43 in the form of a stream prescribed in the MPEG2-TS, and the stream thus encoded is supplied to the scrambling circuit 44. In the scrambling circuit 44, the stream is supplied to the location detection circuit 46, the data hold circuit 47, the XOR circuit 49 and the selection circuit 50.

Figure 9:
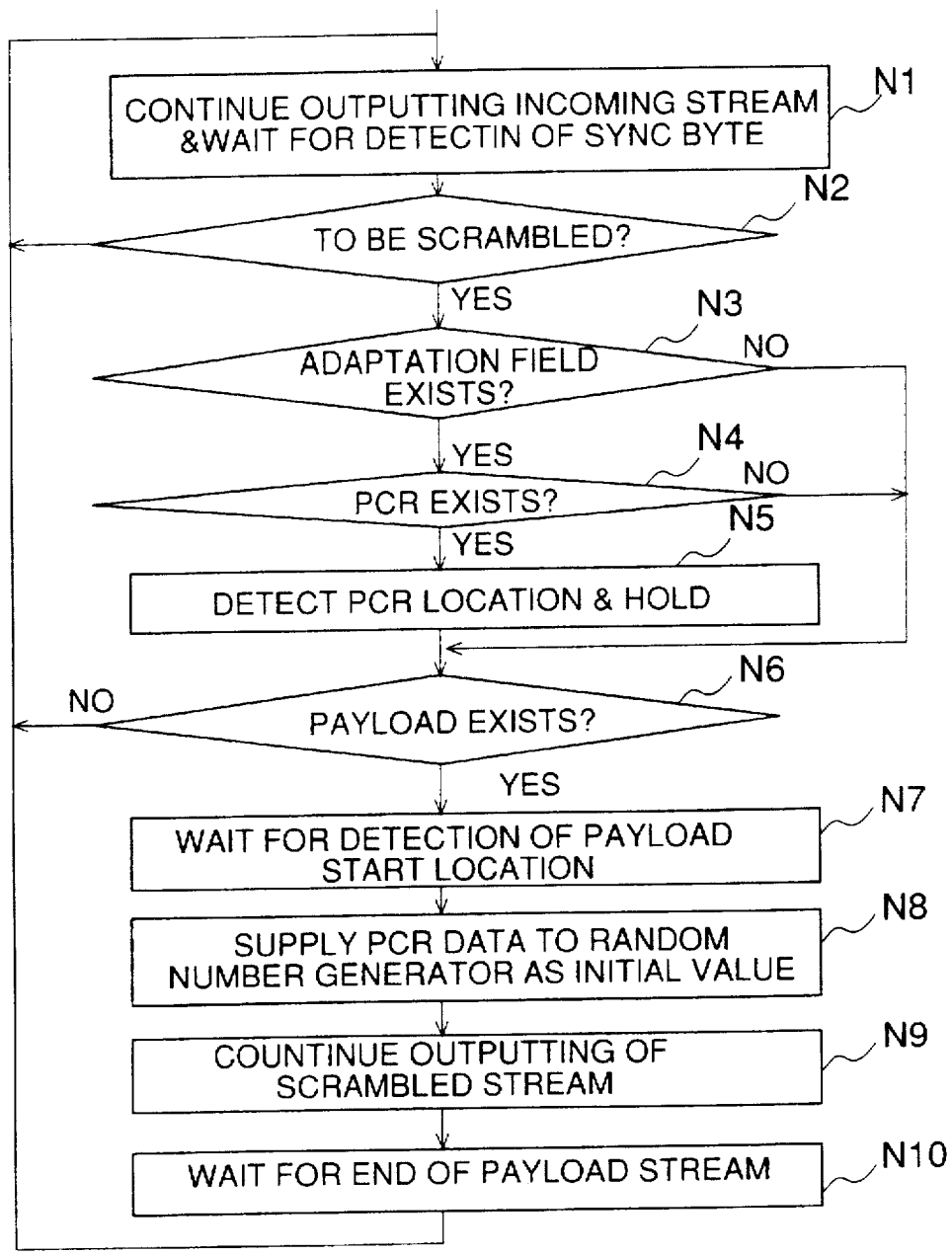
FIG. 9 is a flowchart explaining an operation of a scrambling circuit used in the data transmission system of FIG. 7.

FIG. 9 is a flowchart showing the operation of the scrambling circuit 44 according to the second embodiment of the present invention. In the scrambling circuit 44, the same operation is repeated a number of times. Thus, the description hereinafter will be made starting from the state in which the selection circuit 50 has finished outputting the stream for the payload to be scrambled.

Referring to FIG. 9, the location detection circuit 46 controls the selection circuit 50 such that the stream supplied from the MPEG encoder 43 is continuously output. Thereby, the location detection circuit 46 is in the state for detecting the synchronization byte (step N1).

The location detection circuit 46, in turn, discriminates whether or not the stream for the payload is to be scrambled, based on the content of the scramble control information described in the packet header part, when the synchronization byte is detected (step N2). When the pertinent stream is not the subject of the scrambling, the operation returns to step N1 and the location detection circuit 46 waits for the next incoming of the synchronization code.

When the stream for the packet data is the subject of scrambling ("YES" in the step N2), the location detection circuit 46 discriminates whether there is an adaptation field from the adaptation flag (step N3).

When it is confirmed that the adaptation field exists ("YES" in step N3), the location detection circuit 46 discriminates whether there is a PCR from the PCR flag (step N4). When the PCR exists ("YES" in step N4), the location detection circuit 46 detects the location of the PCR and causes the data hold circuit 47 to hold the PCR data (step N5).

The location detection circuit 46 further discriminates whether or not there is a payload from the payload flag (step N6). If the payload exists ("YES" in the step N6), the location detection circuit 46 waits until the start location of the payload is detected (step N7). When there is no payload ("NO" in the step N7), the operation of the location detection circuit 46 returns to the step N1.

When it is discriminated in step N3 that there is no adaptation field or when it is discriminated in step N4 that there is no PCR, the operation goes to step N6.

The location detection circuit 46, upon detection of the start location of the payload, controls the selection circuit 48, such that the PCR data held by the data hold circuit 47, in other words the PCR data of the packet header part of the payload to be scrambled, is supplied to the random number generator 48 as the initial value (step N8). When there is no PCR existing in the packet header to be scrambled, the PCR data in the packet data immediately before the packet data to be scrambled, is supplied to the random number generator 45 as the initial value (step N8). When the PCR data is not included in the packet data thus selected, a further previous packet data is selected, until the packet data including the PCR data is encountered.

Thus, the XOR circuit 49 applies an XOR operation to the output stream of the MPEG encoder 43 for the part of the stream having the packet data to be scrambled and the random numbers output from the random number generator 45. Thereby, the scrambling is achieved for the stream that includes the payload that is to be scrambled.

Thus, the location detection circuit 46 controls the selection circuit 50 such that the scrambled output stream of the XOR circuit 49 is output continuously (step N9), until the outputting of the payload is finished (step N10). After this, the process returns to the step N1.

The output stream of the MPEG encoder 43 is thus converted to a scrambled stream in which the stream for the packet data is scrambled. The scrambled stream is then transmitted to the descrambling circuit 57 via the digital modulator 51, the up-converter 52, the antennas 53 and 54, and the digital demodulator 56.

Figure 10:
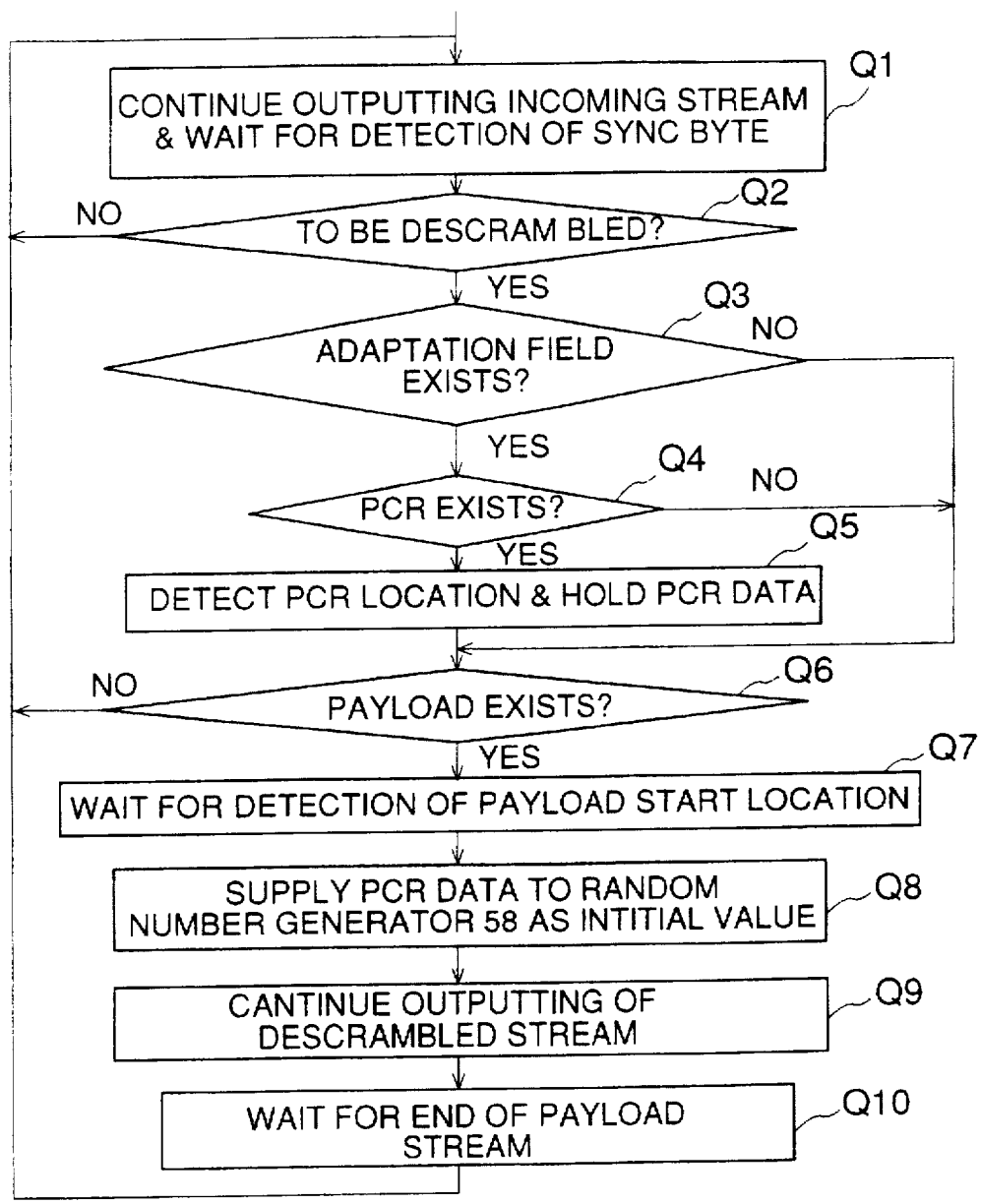
FIG. 10 is a flowchart explaining an operation of a descrambling circuit used in the data transmission system of FIG. 7.

FIG. 10 is a flowchart showing the operation of the descrambling circuit 57 according to the second embodiment of the present invention. In the descrambling circuit 57, the same operation is repeated a number of times. Thus, the description hereinafter will be made starting from the state in which the selection circuit 63 has finished outputting the stream for the packet data to be descrambled.

Referring to FIG. 10, the location detection circuit 59 controls the selection circuit 63 such that the stream supplied from the digital demodulator 56 is continuously output (step Q1). Thereby, the location detection circuit 59 is set in the state for detecting the synchronization byte.

The location detection circuit 59, in turn, discriminates whether or not the stream for the payload is subjected to descrambling, based upon the content of the scramble control information described in the packet header part, when the synchronization byte is detected (step Q2). When the pertinent stream is not the subject of the descrambling, the operation returns to the step Q1 and the location detection circuit 59 waits for the next incoming of the synchronization byte.

When the stream for the payload is the subject of descrambling ("YES" in the step Q2), the location detection circuit 59 discriminates whether or not the adaptation field exists from the adaptation flag (step Q3).

When it is confirmed that the adaptation field exists ("YES" in step S3), the location detection circuit 59 discriminates whether nor not there exists a PCR from the PCR flag (step Q4). When the adaptation field exists ("YES" in step Q4), the location detection circuit 59 detects the location of the PCR and causes the data hold circuit 60 to hold the PCR data (step Q5).

After this, the location detection circuit 59 discriminates whether or not there is a payload from the payload flag (step Q6), and if the payload exists ("YES" in step Q6), the location detection circuit 59 waits for the detection of the start location of the payload (step Q7). When there is no payload (NO in the step Q6), process returns to the step Q1.

When it is discriminated in step Q3 that there is no adaptation field ("NO" in step Q3), or when it is discriminated in the step S4 that there is no PCR ("NO" in the step Q4), the process proceeds to the step Q6.

The location detection circuit 59, upon detection of the start location of the payload after the step Q7, controls the selection circuit 61, such that the PCR data held by the data hold circuit 60, in other words the PCR data in the payload to be descrambled, is supplied to the random number generator 58 as the initial value. When there is no PCR existing in the packet header of the payload to be descrambled, the PCR data in the packet header of the payload immediately before the payload to be descrambled, is supplied to the random number generator 58 as the initial value (step Q8). When there is no PCR data again in the packet header of the packet data, a further previous payload is selected, until a payload including the PCR data is encountered.

Thus, the XOR circuit 62 applies an XOR operation to the output stream of the digital demodulator 56 for the part of the payload to be descrambled and the random numbers output from the random number generator 58. Thereby, the descrambling is achieved for the stream that includes the payload that is to be descrambled.

Thus, the location detection circuit 59 controls the selection circuit 63 such that the scrambled output stream of the XOR circuit 62 is output continuously (step Q9), until the stream for the packet data is finished (step Q10). After this, the process returns to step Q1.

The stream thus output from the demodulator 56 is converted to a descrambled stream by the descrambling circuit 57 such that the stream for the payload is descrambled in the descrambling circuit 57. The descrambled stream is then supplied to the MPEG decoder 64.

In the MPEG decoder 64, the stream for the image data and the stream for the audio data are separated from the descrambled stream and encoded, wherein the image data and the audio data thus encoded are supplied to the television receiver 65.

Thus, in the data transmission system and method according to the second embodiment of the present invention, the stream of the MPEG2-TS format output from the MPEG encoder 43 is converted to a scrambled stream by the scrambling circuit 44 in which the stream for the payload is scrambled. The scrambled stream is then supplied to the descrambling circuit 57 for descrambling. The stream thus descrambled is then transmitted to the MPEG decoder 64.

In the scrambling circuit 44, the scrambling is made by supplying the PCR data in the packet header of the of payload to be scrambled to the random number generator 45 as an initial value. When there is no PCR existing in the packet header of the payload to be scrambled, the PCR data in the packet header of the payload immediately before the payload to be scrambled, is supplied to the random number generator 45 as the initial value. When there is no PCR data again in the packet header of the payload, a further previous payload is selected, until a payload including the PCR data is encountered.

In the descrambling circuit 57, the descrambling is made by supplying the PCR data in the packet header of the payload to be descrambled to the random number generator 58 as an initial value. When there is no PCR existing in the packet header of the payload to be descrambled, the PCR data in the packet header of the payload immediately before the payload to be descrambled, is supplied to the random number generator 58 as the initial value. When there is no PCR data again in the packet header of the payload, a further previous payload is selected, until a payload including the PCR data is encountered.

According to the data transmission method and system of the second embodiment of the present invention, the random number generator 58 of the descrambling circuit 57 is supplied, for each stream for the payload to be descrambled, with the PCR data of which data value is not constant. Thereby, analysis of the random number pattern generated by the random number generator 58 becomes difficult, and the security of the data transmission is improved substantially.

In the present embodiment, it is possible to use the value of the cyclic counter as the initial value in the random number generators 45 and 58, in stead of using the PCR data. Further, it is possible to use data produced by combining the PCR and the cyclic counter value. Alternatively, the initial value may be obtained by applying an operation to the PCR and the cyclic counter value.

[Third Embodiment]

Figure 11:
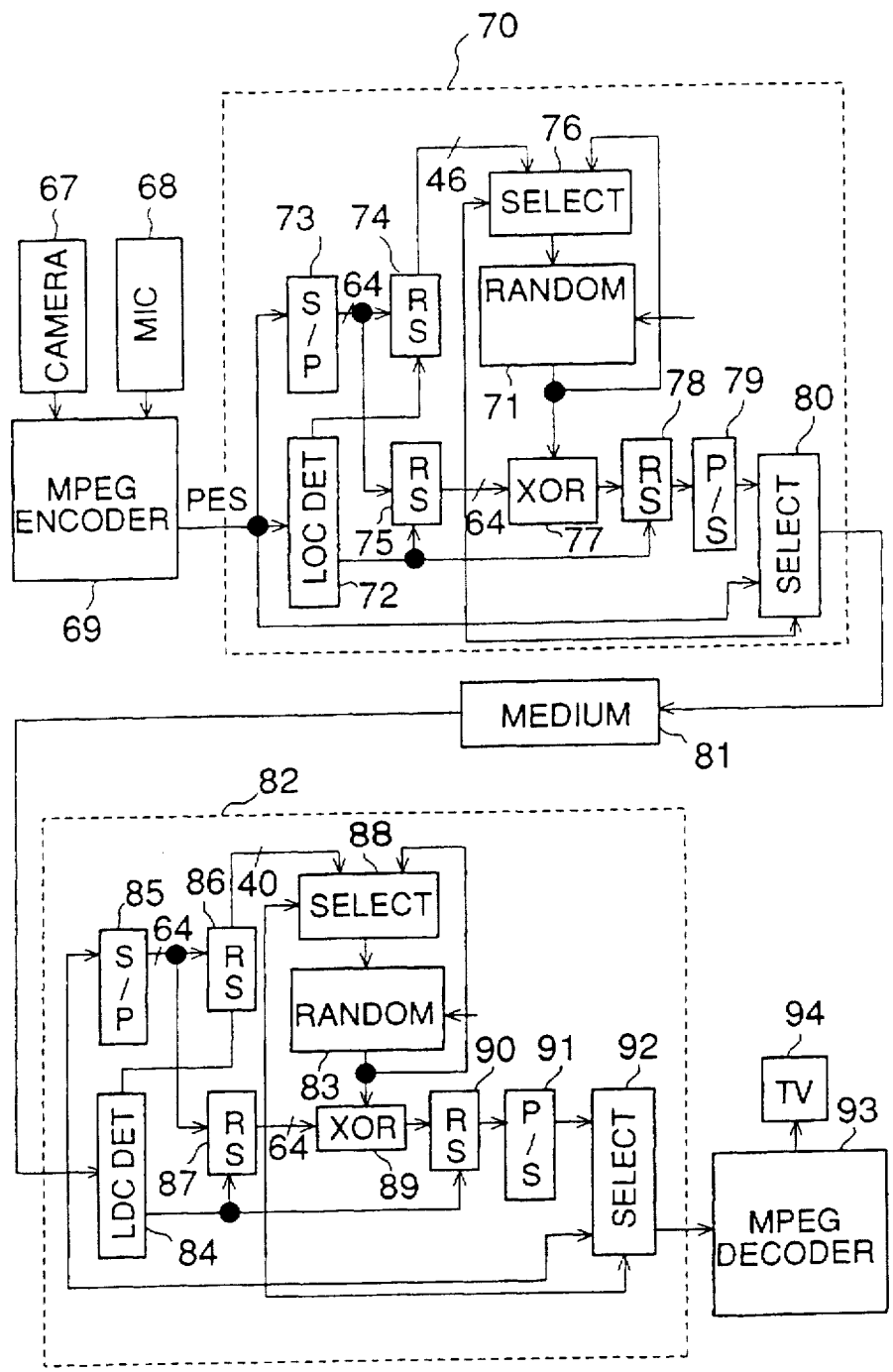
FIG. 11 is a diagram showing a construction of a data transmission system according to a third embodiment of the present invention.

FIG. 11 shows a construction of a data transmission system according to a third embodiment of the present invention.

Referring to FIG. 11, the data transmission system includes a camera 67 for acquiring image data, a microphone 68 for acquiring audio data, and an MPEG encoder 69 encoding the image data thus acquired by the camera 67 and the audio data thus acquired by the microphone 68 and further multiplexing the same by a time-divisional multiplexing technique, to produce a stream prescribed by MPEG2-PS.

In FIG. 11, the system includes a scrambling circuit 70 that scrambles the output stream of the MPEG encoder 69, by scrambling the stream of the packet data.

The scrambling circuit 70 includes a random number generator 71 and a location detection circuit 72, wherein the random number generator 71 is a random number generator of the DES (Data Encryption Standard) type and produces a series of random numbers specified by a key signal. On the other hand, the location detection circuit 72 is supplied with the output stream of the MPEG encoder 69 and carries out various operations such as detection of a packet start code, confirmation of the content of the PES scramble control, confirmation of the PTS & DTS flag, location detection of the PTS, detection of the starting location of the packet data, and the like.

The scrambling circuit 70 further includes a serial-to-parallel converter 73 that carries out a parallel conversion of the output stream of the MPEG encoder 69 to a parallel stream of 64 bits, and a register 74 of a 40 bit size for holding the PTS data. The register 74 is controlled by the location detection circuit 72, upon the detection of the location of the PTS by the location detection circuit 72, such that the register 74 holds the PTS data output from the serial-to-parallel converter 73.

Further, the scrambling circuit 70 includes another register 75 of a 64-bit size, wherein the register 75 is controlled by the location detection circuit 72 and holds the stream for the packet data to be scrambled.

The scrambling circuit 70 further includes a selection circuit 76 that selectively supplies either the PTS data held by the register 74 or random numbers generated by the random number generator 71, to the random number generator 71 itself. Thus, the selection circuit 76 supplies the PTS data held in the register 74 to the random number generator 71 as the initial value when the location detection circuit 72 detects the start location of the packet data to be scrambled. Thereafter, the selection circuit 76 is controlled by the location detection circuit 72, until the stream of the packet data is completed, such that the random numbers generated by the random number generator 71 are fed back to the random number generator 71.

It should be noted that the location detection circuit 72, the register 74 and the selection circuit 76 together form an initial value supplying circuit in the scrambling circuit 70.

The scrambling circuit 70 further includes an XOR circuit 77 that applies an XOR operation to the output parallel stream of the register 75 and to the random numbers output by the random number generator 71. As a result of the XOR operation, the stream for the packet data is scrambled.

The scrambling circuit 70 further includes a register 78 of a 64 bit size for storing the parallel stream output from the XOR circuit 77 under control of the location detection circuit 72 and a parallel-to-serial converter 79 for converting the parallel stream output from the register 78 to a serial stream.

Further, the scrambling circuit 70 includes a selection circuit 80 that selectively outputs the output stream of the MPEG encoder 69 or the output stream of the parallel-to-serial converter 79. The selection circuit 80 is controlled by the location detection circuit 72 such that a scrambled stream is output. In the scrambled stream, the packet data of the stream output by the MPEG encoder 69 is scrambled.

The output stream of the selection circuit 80 is supplied to a medium 81, which may be a disk, wherein the medium 81 stores the output stream of the scrambling circuit 70. The output stream of the scrambling circuit 70 thus stored in the medium 81 is then descrambled by a descrambling circuit 82. More specifically, the descrambling circuit 82 converts the stream read out from the medium 81 to a stream in which the scrambled packet data in the scrambled stream is descrambled.

It should be noted that the descrambling circuit 82 includes a random number generator 83 identical to the random number generator 71 and uses the same key signal used in the random number generator 71.

The descrambling circuit 82 further includes a location detection circuit 84, wherein the location detection circuit 84 is supplied with the output stream of the scrambling circuit 70 via the medium 81 and carries out various operations such as detection of a packet start code, confirmation of the content of the PES scramble control, confirmation of the PTS & DTS flag, location detection of the PTS, detection of the starting location of the packet data, and the like.

The descrambling circuit 82 further includes a serial-to-parallel converter 85 that carries out a serial-to-parallel conversion of the serial stream from the medium 81 to a parallel stream of a 64-bit width, and a register 86 of a 40 bit width for holding the PTS data. The register 86 is controlled by the location detection circuit 84, upon the detection of the location of the PTS by the location detection circuit 84, such that the register 86 holds the PTS data output from the serial-to-parallel converter 85.

Further, the scrambling circuit includes another register 87 of a 64-bit width, wherein the register 87 is controlled by the location detection circuit 84 and holds the stream for the packet data to be descrambled.

The descrambling circuit 82 further includes a selection circuit 88 that selectively supplies either the PTS data held by the register 86 or random numbers generated by the random number generator 83, to the random number generator 83 itself. Thus, the selection circuit 88 supplies the PTS data held by the register 86 to the random number generator 83 as the initial value when the location detection circuit 84 detects the start location of the packet data to be descrambled. Thereafter, the selection circuit 88 is controlled by the location detection circuit 84, until the stream of the packet data is completed, such that the random numbers generated by the random number generator 83 are fed back to the random number generator 83.

It will be noted that the location detection circuit 84, the register 86 and the selection circuit 88 together form an initial value supplying circuit in the descrambling circuit 82.

The descrambling circuit 82 further includes an XOR circuit 89 that applies an XOR operation to the stream supplied from the register 87 for the part of the packet data, which is subjected to the descrambling, and further to the random numbers output by the random number generator 83. As a result of the XOR operation, the stream for the packet data is descrambled.

The descrambling circuit 82 further includes a register 90 of a 64-bit construction for holding the parallel stream output from the XOR circuit 89 under control of the location detection circuit 84, and a parallel-to-serial converter 91 for converting the output parallel stream of the register 90 to a serial stream.

Further, the descrambling circuit 82 includes a selection circuit 92 that selectively outputs the stream from the medium 81 or the stream from the parallel-to-serial conversion circuit 91. The selection circuit 92 is controlled by the location detection circuit 84 such that a descrambled stream is output. In the descrambled stream, the packet data of the stream supplied from the medium 81 is descrambled.

The stream thus descrambled by the descrambling circuit 82 and output from the selection circuit 92 is supplied to an MPEG decoder 93 for separation and decoding of the stream for the image data and the stream for the audio data, wherein the image data and the audio data thus decoded are supplied to a television receiver 94.

In such a data transmission system, the image data acquired by the camera 67 and the audio data acquired by the microphone 68 are encoded by the MPEG encoder 69 in the form of a stream prescribed by the MPEG2-PS, wherein the stream thus produced is supplied to the scrambling circuit 70. In the scrambling circuit 70, the stream is supplied to the location detection circuit 72, the serial-to-parallel converter 73, and the selection circuit 80.

In operation, the location detection circuit 72 decides whether or not the stream for the packet data is subjected to scrambling, based upon the content of the scramble control information described in the packet header part, when the packet start code is detected. When the pertinent stream is not the subject of scrambling, the operation returns to the state for waiting for the incoming of the packet start code.

When the stream for the packet data is the subject of scrambling, the location detection circuit 72 discriminates whether the PTS & DTS flag in the packet header is "10" or "11". In other words, existence of the PTS data is checked in this step.

When it is confirmed that the PTS & DTS flag is "10" or "11," in other words, when it is confirmed that the PTS data exists, the location detection circuit 72 detects the location of the PTS and causes the register 74 to hold the PTS data. After this, the scrambling circuit 70 waits for the detection of the start location of the packet data.

On the contrary, when the PTS & DTS flag is other than "10" or "11," in other words when there is no PTS data existing, the location detection circuit 72 continues detecting the start location of the packet data.

The location detection circuit 72, upon detection of the start location of the packet data, controls the selection circuit 76, such that the PTS data held by the register 74 is supplied to the random number generator 71 as the initial value. When there is no PTS data existing in the packet header of the packet data to be scrambled, the PTS data in the packet data immediately before the packet data to be scrambled, is supplied to the random number generator 71 as the initial value. When the PTS data is not included in the packet data thus selected, a further previous packet data is selected, until the packet data including the PTS data is encountered. Further, the output stream of the serial-to-parallel converter 73 is held by the register 75.

Thus, the XOR circuit 77 applies an XOR operation to the output stream of the register 75 for the part of the stream having the packet data to be scrambled and the random numbers output from the random number generator 71. Thereby, the scrambling is achieved for the stream that includes the packet data that is to be scrambled. The resultant scrambled stream is held in the register 78, and the parallel stream output from the register 78 is converted to the serial stream by the parallel-to-serial converter 79.

Thus, the location detection circuit 72 controls the selection circuit 80 such that the scrambled output stream of the parallel-to-serial converter 79 is output continuously, until the stream for the packet data is finished, and such that the output stream of the MPEG encoder 69 is output as it is after the output of the scrambled stream is finished.

Thereby, the output stream of the MPEG encoder 69 is converted to the scrambled stream in which the stream for the packet data is scrambled. The scrambled stream is then stored in the storage medium 81, wherein the stream thus stored in the medium 81 is supplied to the descrambling circuit 82 as necessary.

In the descrambling circuit 82, the stream from the medium 81 is supplied to the location detection circuit 84, the serial-to-parallel converter 85 and the selection circuit 92.

In the descrambling circuit, the location detection circuit 84 decides whether or not the stream for the packet data is subjected to the descrambling, based upon the content of the scramble control information described in the packet header part, when the packet start code is detected. When the pertinent stream is not the subject of the descrambling, the operation returns to a state of waiting for the incoming of the packet start code.

When the stream for the packet data is scrambled, the location detection circuit 84 discriminates whether the PTS & DTS flag in the packet header part is "10" or "11". In other words, existence of the PTS data is checked in this step.

When it is confirmed that the PTS & DTS flag is "10" or "11", in other words, when it is confirmed that the PTS data exists, the location detection circuit 84 detects the location of the PTS and causes the register 86 to hold the PTS data. After this, the descrambling circuit 82 waits for the detection of the start location of the packet data.

On the contrary, when the PTS & DTS flag is other than "10" or "11," in other words when there is no PTS data existing, the location detection circuit 84 continues detecting the start location of the packet data.

The location detection circuit 84, upon detection of the start location of the packet data, controls the selection circuit 88, such that the PTS data held by the register 86 is supplied to the random number generator 83 as the initial value. When there is no PTS data existing in the packet header of the packet data to be descrambled, the PTS data in the packet data immediately before the packet data to be descrambled, is supplied to the random number generator 83 as the initial value. When there is no PTS data again in the packet header of the packet data, a further previous packet data is selected, until a packet data including the PTS data is encountered. Further, the output stream of the serial-to-parallel converter 85 is held by the resister 87.

Thus, the XOR circuit 89 applies the XOR operation to the output stream of the register 87 for the part of the stream having the packet data to be descrambled and the random numbers output from the random number generator 83. Thereby, the scrambling is achieved for the stream that includes the packet data that is to be descrambled.

Thus, the location detection circuit 84 controls the selection circuit 92 such that the scrambled output stream of the parallel-to-serial converter 91 is output continuously, until the stream for the packet data is finished. After this, the selection circuit 92 is controlled such that the stream from the medium 81 is output as it is.

Thus, the stream supplied from the medium 81 is converted to a descrambled stream in which the stream for the packet data is descrambled. The descrambled stream is then transmitted to the MPEG decoder 93.

In the MPEG decoder 93, the stream for the image data and the stream for the audio data are separated from the stream supplied from the descrambling circuit 82, wherein the image data stream and the audio data stream thus separated are further decoded by the MPEG decoder 93. The image data and the audio data thus decoded by the MPEG decoder 93 are then transmitted to the television receiver 94.

Thus, according to the third embodiment of the present invention, the output stream of the MPEG encoder 69 in the MPEG2-PS-prescribed format is converted to a scrambled stream by the scrambling circuit 70 such that the stream for the packet data to be scrambled is scrambled. The scrambled stream is then supplied to the descrambling circuit 82 via the medium 81, wherein the descrambling circuit 82 transmits the stream to the MPEG decoder 93 after descrambling.

Here, it should be noted that the scrambling circuit 70 supplies, for each packet data to be scrambled, the PTS data included in the packet header to be scrambled, to the random number generator 71 as the initial value. When there is no PTS data in the packet header of the packet data to be scrambled, the PTS data in the packet data immediately before the packet data to be scrambled, is supplied to the random number generator 71 as the initial value. When there is no PTS data again in the packet header of the packet data thus selected, a further previous packet data is selected, until a packet data including the PTS data is encountered.

In conformity to the foregoing, the descrambling circuit 82 carries out the descrambling by supplying, for each packet data to be scrambled, the PTS data included in the packet header to be descrambled, to the random number generator 83 as the initial value. When there is no PTS data in the packet header of the packet data to be descrambled, the PTS data in the packet data immediately before the packet data to be descrambled, is supplied to the random number generator 83 as the initial value. When there is no PTS data again in the packet header of the packet data thus selected, a further previous packet data is selected, until a packet data including the PTS data is encountered.

According to the data transmission method and system of the third embodiment of the present invention, the random number generator 83 of the descrambling circuit 82 is supplied, for each scrambled stream for the packet data, with the PTS data in which the data value is not constant or fixed. Thereby, the analysis of the random number pattern generated by the random number generator 83 becomes substantially difficult, and the security of the data transmission is improved substantially.

[Fourth Embodiment]

Figure 12:
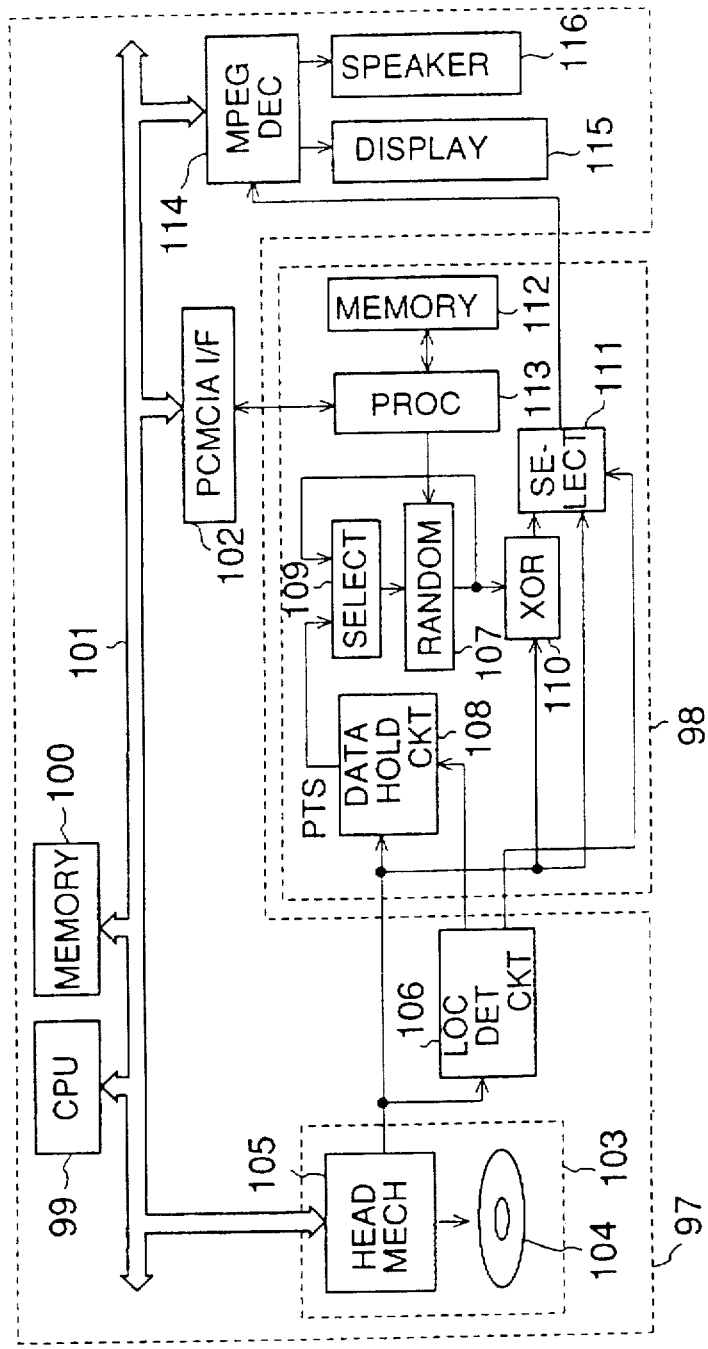
FIG. 12 is a diagram showing a construction of a data transmission system according to a fourth embodiment of the present invention.

FIG. 12 shows a data transmission system for implementing a data transmission method according to a fourth embodiment of the present invention.

Referring to FIG. 12, the data transmission system includes a personal computer 97 and a PCMCIA (Personal Computer Memory Card International Association) card 98 constructed in conformity to the Release 2.0 of PCMCIA.

The personal computer 97 includes a CPU (Central Processing Unit) 99, a memory 100, a bus 101 and a PCMCIA interface 102.

Further, the personal computer 97 includes a disk drive 103 including a disk 104, wherein the disk 104 stores a MPEG2-PS stream in a scrambled state in which the stream for the packet data is scrambled. Further, the disk drive includes a head mechanism 105 for reading the stream from the disk 104.

The system of FIG. 12 further includes a location detection circuit 106 which is supplied with the stream read out by the head mechanism 105 and carries out various operations such as detection of the packet start code, confirmation of the content of the PES scramble control, confirmation of the PTS & DTS flag, location detection of the PTS, detection of the starting location of the packet data, and the like.

Further, the PCMCIA card 98 includes a random number generator 107 for generating a series of random numbers specified by a key signal, and a data hold circuit 108 for holding the PTS data, wherein the data hold circuit 108 is controlled, when the location detection circuit 106 detects the location of the PTS data, so as to hold the PTS data, of which location is thus detected.

The PCMCIA card 98 further includes a selection circuit 109 that selectively supplies either the PTS data held by the data hold circuit 108 or the random numbers generated by the random number generator 107, to the random number generator 107 itself. Thus, the selection circuit 109 supplies the PTS data held in the data hold circuit 108 to the random number generator 107 as the initial value when the location detection circuit 106 detects the start location of the packet data to be scrambled. Thereafter, the selection circuit 109 is controlled by the location detection circuit 106, until the stream of the packet data is completed, such that the random numbers generated by the random number generator 107 are fed back to the random number generator 107.

The PCMCIA card 98 further includes an XOR circuit 110 that applies an XOR operation to the output stream from the head mechanism 105 for the part of the packet data, which is subjected to the scrambling, and further to the random numbers output by the random number generator 107. As a result of the XOR operation, the stream for the packet data is descrambled.

Further, the PCMCIA card 98 includes a selection circuit 111 that selectively outputs the output stream of the head mechanism 105 and the output stream of the XOR circuit 110. The selection circuit 111 is controlled by the location detection circuit 106 such that a descrambled stream is output. In the descrambled stream, the scrambled packet data of the stream output by the head mechanism 105 is descrambled.

In addition, the PCMCIA card 98 includes a memory device 112 for storing ID data for identification of the user, and the like, and a processing circuit 113 cooperating with the memory device 112 for outputting the ID data thus read out from the memory device 112.

It should be noted that the location detection circuit 106 and the PCMCIA card 98 together form a descrambling circuit according to the fourth embodiment of the present invention.

Further, it should be noted that the location detection circuit 106, the data hold circuit 108 and the selection circuit 109 form an initial value supplying circuit of a descrambling circuit. The location detection circuit 106 may be provided inside the PCMCIA card 98, althought it is more preferable to provide the location detection circuit 106 inside the personal computer 97 for decreasing the number of input and output pins of the PCMCIA card 98.

It should be noted that the personal computer 97 includes an MPEG decoder 114 wherein the MPEG decoder 114 separates and decodes the image data stream and audio data stream from the stream output from the selection circuit 111 to reproduce image data and audio data.

Further, the personal computer 97 includes a display device 115 supplied with the image data from the MPEG decoder 114 and a speaker supplied with the audio data from the MPEG decoder 114.

In the data transmission system of FIG. 12, the CPU 99 urges the PCMCIA card 98 to output the ID data, when the PCMCIA card 98 is inserted into the personal computer 97, wherein the CPU 99 decides whether or not the ID data thus output is acceptable. If the result is "YES," the CPU 99 causes the processing circuit 113 to generate a key signal identical to the key signal used when scrambling the data on the disk 104. Thereby, the random number generator 107 generates a series of random numbers identical to the series of the random numbers used at the time of scrambling.

Upon activation of the disk drive 103, the stream stored in the disk 104 is read out by the head mechanism 105 and is supplied to the location detection circuit 106, the data hold circuit 108 in the PCMCIA card 98, the XOR circuit 110 and the selection circuit 111.

The location detection circuit 106 then decides whether or not the stream for the packet data is to be descrambled, based upon the content of the scramble control information described in the packet header, when the packet start code is detected. When the pertinent stream is not the subject of the descrambling, the operation returns to the state for waiting for the incoming of the packet start code.

When the stream for the packet data is the subject of the descrambling, on the other hand, the location detection circuit 106 discriminates whether the PTS & DTS flag in the packet header part is "10" or "11". In other words, existence of the PTS data is checked in this step.

When it is confirmed that the PTS & DTS flag is "10" or "11," in other words, when it is confirmed that the PTS data exists, the location detection circuit 106 detects the location of the PTS data and causes the data hold circuit 108 to hold the PTS data. After this, the location detection circuit 106 takes a state of waiting for the detection of the start location of the packet data.

On the contrary, when the PTS & DTS flag is other than "10" or "11," in other words, when there is no PTS data existing, the location detection circuit 106 continues detecting the start location of the packet data.

The location detection circuit 106, upon detection of the start location of the packet data, controls the selection circuit 109, such that the PTS data held by the data hold circuit 108 is supplied to the random number generator 107 as the initial value. When there is no PTS data existing in the packet header of the packet data to be descrambled, the PTS data in the packet data immediately before the packet data to be descrambled, is supplied to the random number generator 107 as the initial value. When there is no PTS data again in the packet header of the packet data, a further previous packet data is selected, until a packet data including the PTS data is encountered.

Thus, the XOR circuit 110 applies the XOR operation to the output stream of the head mechanism 105 for the part of the stream having the packet data to be descrambled and the random numbers output from the random number generator 107. Thereby, the descrambling is achieved for the stream that includes the packet data that is to be descrambled.

Thus, the location detection circuit 106 controls the selection circuit 111 such that the descrambled output stream of the XOR circuit 110 is output continuously, until the stream for the packet data is finished. After this, the stream from the head mechanism 105 is output as it is.

Thus, the scrambled stream supplied from the head mechanism 105 is converted to a descrambled stream in which the stream for the packet data is descrambled. The descrambled stream is then transmitted to the MPEG decoder 114.

In the MPEG decoder 114, the stream for the image data and the stream for the audio data are separated from the stream supplied from the PCMCIA card 98, wherein the image data stream and the audio data stream thus separated are further decoded by the MPEG decoder 114. The image data and the audio data thus decoded are then transmitted to the display device 115 and the speaker 116.

Thus, according to the data transmission system and method of the fourth embodiment of the present invention, the scrambled stream read out from the disk 104, in which the packet data of an MPEG-PS2 stream is scrambled, is descrambled by a descrambling circuit that includes the location detection circuit 106 and the PCMCIA card 98.

Here, it should be noted that the descrambling circuit including the detection circuit 106 and the PCMCIA card 98 carries out the descrambling by supplying, for each packet data to be descrambled, the PTS data included in the packet header to be descrambled, to the random number generator 107 as the initial value. When there is no PTS data existing in the packet header of the packet data to be descrambled, the PTS data in the packet data immediately before the packet data to be descrambled, is supplied to the random number generator 107 as the initial value. When there is no PTS data again in the packet header of the packet data thus selected, a further previous packet data is selected, until a packet data including the PTS data is encountered.

According to the data transmission method and system of the fourth embodiment of the present invention, the random number generator 107 in the PCMCIA card 98 is supplied, for each scrambled stream for the packet data, with the PTS data in which the data value is not constant or fixed. Thereby, the analysis of the random number pattern generated by the random number generator 107 becomes substantially difficult, and the security of the data transmission is improved substantially.

Further, it is possible to construct the PCMCIA card to carry accounting information. In this case, it is possible to charge a fee for the information that is read out from the disk 104.

[Fifth Embodiment]

Figure 13:
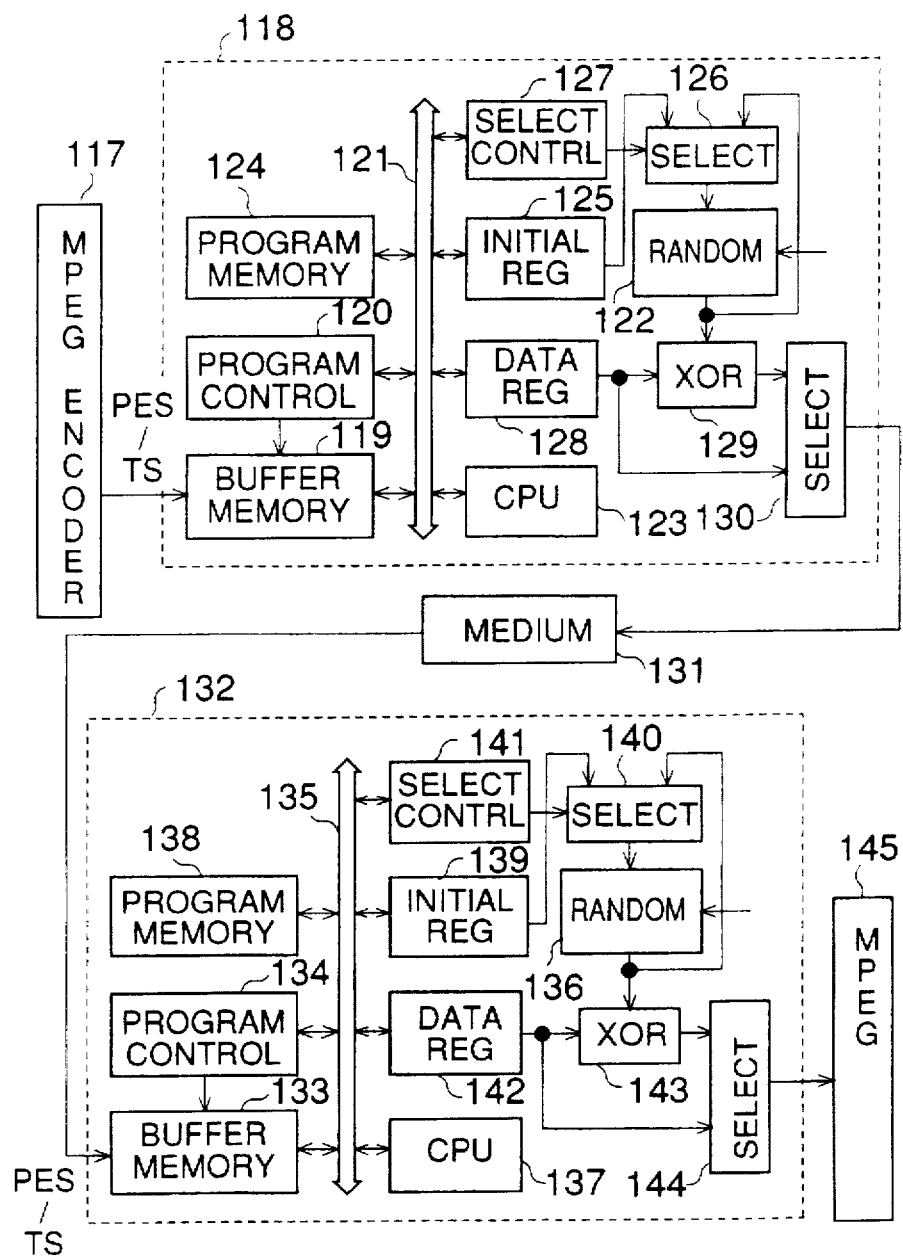
FIG. 13 is a diagram showing a construction of a data transmission system according to a fifth embodiment of the present invention.

FIG. 13 shows a data transmission system for implementing a data transmission method according to a fifth embodiment of the present invention.

Referring to FIG. 13, the system includes an MPEG encoder 117 that encodes image data acquired by a camera and audio data acquired by a microphone to produce a bit stream prescribed by MPEG2-PS or MPEG2-TS, by multiplexing the same according to a time-divisional multiplexing.

Further, the data transmission system of FIG. 13 includes a scrambling circuit 118 that converts the output stream of the MPEG encoder 117 into a scrambled stream in which the stream for the packet data is scrambled.

It should be noted that the scrambling circuit 118 is used in the previous embodiment for scrambling the stream.

The scrambling circuit 118 includes a buffer memory 119 for storing the output stream of the MPEG encoder 117, a memory controller 120 for controlling the buffer memory 119 and a bus 121.

Further, the scrambling circuit 118 includes a random number generator 122 and a location detection circuit 123, wherein the random number generator 122 is a random number generator of the DES (Data Encryption Standard) type and produces a series of random numbers specified by a key signal. On the other hand, the location detection circuit 123 is provided by a CPU implemented in the form of an integrated circuit, wherein the CPU 123 carries out various operations such as detection of a packet start code, confirmation of the content of the PES scramble control, confirmation of the PTS & DTS flag, location detection of the PTS and detection of the starting location of the packet data, for a MPEG2-PS stream. In the case of a MPEG2-TS stream, the location detection circuit 123 carries out operations such as detection of a synchronization byte, confirmation of the content of the adaptation flag, confirmation of the content of the payload flat, confirmation of the content of the PCR flat, detection of a PCR location, detection of the start location of the payload, and the like.

Further, the scrambling circuit 118 includes a program memory 124 for storing a program that switches the operation of the CPU 123 depending upon whether the stream from the MPEG encoder 117 is an MPEG2-PS stream or an MPEG2-TS stream.

The scrambling circuit 118 further includes a data register 125 for holding an initial value to be supplied to the random number generator 122. Thus, the data register 125 stores the PTS data when the output stream of the MPEG encoder 117 is an MPEG2-PS stream. When the stream from the MPEG encoder 117 is a MPEG2-TS stream, the data register 125 stores the PCR data.

The scrambling circuit 118 further includes a selection circuit 126 and a control register 127 controlling the operation of the selection circuit 126, wherein the selection circuit 126 selectively supplies either the data held by the data register 125 or the random numbers generated by a random number generator 122, to the random number generator 122 itself.

Thus, the selection circuit 126 supplies the data held in the data register 125 to the random number generator 122 as the initial value when the CPU 123 detects the start location of the packet data or payload to be scrambled. Thereafter, the selection circuit 126 is controlled by the output of the control register 127, until the stream of the packet data or the payload is completed, such that the random numbers generated by the random number generator 122 are fed back to the random number generator 122.

The scrambling circuit 118 further includes a data register 128 for storing the output stream of the buffer memory 119 and an XOR circuit 129 that applies an XOR operation to the output stream of the data register 128 for the part of the packet data to be scrambled, and further to the random numbers output by the random number generator 122. As a result of the XOR operation, the stream for the packet data is scrambled.

Further, the scrambling circuit 118 includes a selection circuit 130 that selectively outputs the output stream of the data register 128 and the output stream of the XOR circuit 129. The selection circuit 130 is controlled such that a scrambled stream for the packet data or the payload is output. In the scrambled stream, the packet data or the payload of the stream from the data register 128 is scrambled.

The output stream of the selection circuit 130 is supplied to a medium 131, which may be a disk, wherein the medium stores the output stream of the scrambling circuit 118.

The output stream of the scrambling circuit 118 thus stored in the medium 131 is then descrambled by a descrambling circuit 132.

More specifically, the descrambling circuit 132 includes a buffer memory 133 for storing the stream output from the medium 131, a memory controller 134 for controlling the buffer memory 133 and a bus 135.

Further, the descrambling circuit 132 includes a random number generator 136 which is identical in construction to the random number generator 122 and is supplied with a key signal identical to the key signal used in the random number generator 136.

The descrambling circuit 132 further includes a location detection circuit 137, wherein the location detection circuit 137 is provided by a CPU and carries out various operations such as detection of a packet start code, confirmation of the content of the PES scramble control, confirmation of the PTS & DTS flag, location detection of the PTS, detection of the starting location of the packet data, and the like, for a MPEG2-PS stream. When the stream supplied to the location detection circuit 137 is a MPEG2-TS stream, on the other hand, the location detection circuit 137 carries out operations such as detection of the synchronization byte, confirmation of the content of the adaptation flag, confirmation of the content of the payload flag, confirmation of the content of the PCR flag, detection of the PCR location, detection of the start location of the payload, and the like.

Further, the descrambling circuit 132 includes a program memory 138 that switches the operation of the CPU 137 depending on whether the stream from the medium 131 is an MPEG2-PS stream or an MPEG2-TS stream.

The descrambling circuit 132 further includes a register 139 for storing an initial value to be supplied to the random number generator 136, wherein the register 139 stores the PTS data when the stream from the medium 131 is an MPEG2-PS stream and the PCR data when the stream is an MPEG2-TS stream.

Further, the descrambling circuit 132 further includes a selection circuit 140 that selectively supplies either the data held by the data register 139 or the random numbers generated by the random number generator 136, to the random number generator 136 itself, under control of a selection control register 141 that controls the operation of the selection circuit 140.

Thus, it will be noted that the selection circuit 140 causes the data register 139 to supply the initial value held therein to the random number generator 136 in response to the detection of the scrambled packet data or payload by the CPU 137. Thereafter, the selection circuit 140 is controlled by the output of the selection control register 141 such that the output random numbers of the random number generator 136 are fed back to the random number generator 136 itself, until the stream for the packet data or the stream for the payload is completed.

Further, the descrambling circuit 132 includes a data register 142 for storing the output stream of the buffer memory 133 and an XOR circuit 143, wherein the XOR circuit 143 applies an XOR operation to the output stream of the data register 142 and further to the output random numbers of the random number generator 136. As a result of the XOR operation, the scrambled stream for the packet data is descrambled.

Further, the descrambling circuit 132 includes a selection circuit 144 that selectively outputs the output stream of the data register 142 or the output stream of the XOR circuit 143. The selection circuit 144 is controlled such that a descrambled stream is output, in which the packet data or payload is descrambled in the stream supplied from the data register 142.

The stream thus descrambled by the descrambling circuit 132 is supplied to an MPEG decoder 145 for separation and decoding of the stream for the image data and the stream for the audio data, wherein the image data and the audio data thus decoded are supplied to a television receiver 145.

In such a data transmission system, the image data acquired by the camera and the audio data acquired by the microphone are encoded by the MPEG encoder 117 in the form of a stream prescribed by the MPEG2-PS or MPEG2-TS, wherein the stream thus encoded is supplied to the scrambling circuit 118.

In the scrambling circuit 118, the stream is stored in the buffer memory 119 and is read out by the CPU 123.

When the output stream of the MPEG encoder 117 is an MPEG2-PS stream, the CPU 123 carries various operations such as detection of the packet start code, confirmation of the content of the PES scramble control, confirmation of the content of the PTS & DTS, detection of the location of the PTS, detection of the start location of the packet data, and the like.

When the CPU 123 has detected a packet start code, a discrimination is made whether or not the stream for the packet data is to be scrambled or not, based upon the content of the scrambling control in the packet header. When the pertinent stream is not the subject of the scrambling, the CPU 123 returns to the state for detecting the packet start code.

When the stream for the packet data is to be scrambled, the CPU 123 discriminates whether the PTS & DTS flag in the packet header is "10" or "11." In other words, existence of the PTS data is checked in this step.

When it is confirmed that the PTS & DTS flag is "10" or "11," in other words, when it is confirmed that the PTS data exists, the CPU 123 detects the location of the PTS data and causes the data register 125 to hold the PTS data. After this, the CPU 123 assumes the state of waiting for the detection of the start location of the packet data.

On the contrary, when the PTS & DTS flag is other than "10" or "11," in other words when there is no PTS data existing, the CPU 123 continues detecting the start location of the packet data.

The CPU 123, upon detection of the start location of the packet data, rewrites the content of the selection control register 127, such that the PTS data held by the data register 125 is supplied to the random number generator 122 as the initial value. When there is no PTS data existing in the packet header of the packet data to be scrambled, the PTS data in the packet data immediately before the packet data to be scrambled, is supplied to the random number generator as the initial value. When the PTS data is not included in the packet data thus selected, a further previous packet data is selected, until the packet data including the PTS data is encountered.

Thus, the XOR circuit 129 applies the XOR operation to the output stream of the data register 128 for the part of the stream including the packet data to be scrambled and the output random numbers of the random number generator 122. Thereby, the scrambling is achieved for the stream that includes the packet data that is to be scrambled.

Thus, the CPU 123 controls the selection circuit 130 such that the scrambled output stream of the XOR circuit 129 is output continuously, until the stream for the packet data is finished. After this, the process returns to the state for detecting the packet start code.

The output stream of the MPEG encoder 117 is converted to a scrambled stream in which the stream for the packet data is scrambled. The scrambled stream is then stored in the storage medium 131, wherein the stream thus stored in the medium 131 is supplied to the descrambling circuit 132 as necessary.

The stream supplied to the descrambling circuit 132 is stored in the buffer memory 133, wherein the stream stored in the buffer memory 133 is read out by the CPU 137.

Upon detection of the packet start code, on the other hand, the CPU 137 discriminates whether or not the stream for the packet data is scrambled based upon the content of the scramble control information in the packet header. When not scrambled, the CPU 137 returns to the state for detecting the packet start code.

When the stream for the packet data is scrambled ("YES" in the step P3), the CPU 137 discriminates whether the PTS & DTS flag in the packet header part is "10" or "11." In other words, existence of the PTS data is checked in this step.

When it is confirmed that the PTS & DTS flag is "10" or "11," in other words, when it is confirmed that the PTS data exists, the CPU 137 detects the location of the PTS and causes the data hold circuit 34 to hold the PTS data. After this, the CPU 137 waits for the detection of the start location of the packet data.

On the contrary, when the PTS & DTS flag is other than "10" or "11," in other words when there is no PTS data existing, the CPU 137 continues detecting the start location of the packet data.

The CPU 137, upon detection of the start location of the packet data, rewrites the selection control resister 141, such that the PTS data held by the data register 139 is supplied to the random number generator 136 as the initial value. When there is no PTS data existing in the packet header of the packet data to be descrambled, the PTS data in the packet data immediately before the packet data to be descrambled, is supplied to the random number generator 136 as the initial value. When there is no PTS data again in the packet header of the packet data, a further previous packet data is selected, until a packet data including the PTS data is encountered.

Thus, the XOR circuit 143 applies an XOR operation to the output stream of the data register 143 for the part of the stream having the packet data to be descrambled and the random numbers output from the random number generator 136. Thereby, the descrambling is achieved for the stream that includes the packet data that is to be descrambled.

Thus, the CPU 137 controls the selection circuit 144 such that the descrambled output stream of the XOR circuit 143 is output continuously, until the stream for the packet data is finished. After this, the process returns to the state for detecting the packet start code.

Thus, the stream supplied from the medium 131 is converted to a descrambled stream in which the stream for the packet data is descrambled. The descrambled stream is then transmitted to the MPEG decoder 145.

In the case in which the MPEG encoder 117 produces a MPEG2-TS stream, the CPU 123 detects the synchronization byte and discriminates, based upon the content of the scramble control field of the packet header, whether or not the stream for the payload is to be scrambled. When the stream is not to be scrambled, the CPU 123 returns to the state for detecting the synchronization byte.

When the stream for the payload is to be scrambled, the CPU 123 discriminates whether there is an adaptation field from the adaptation flag. When there is no adaptation field, the CPU discriminates whether or not a payload exists based upon the payload flag.

When it is confirmed that the adaptation field exists, the CPU 123 discriminates whether or not a PCR from the PCR flag exists. When the PCR does not exist, the CPU 123 discriminates whether or not a payload exists based upon the payload flag.

When the PCR exists, the CPU 123 detects the location of the PCR and causes the data register 125 to hold the PCR data. Further, the CPU 123 discriminates whether or not a payload exists based upon the payload flag.

When the payload does not exist, the CPU 123 takes a state for detecting the synchronization byte, while when the payload exists, the CPU 123 takes a state for detecting the start location of the payload.

The CPU 123, upon detection of the start location of the payload, rewrites the selection control register 127 such that the PCR data held by the data register 125, in other words the PCR data of the packet header of the payload to be scrambled, is supplied to the random number generator 122 as the initial value. When there is no PCR existing in the packet header to be scrambled, the PCR data in the packet data immediately before the packet data to be scrambled, is supplied to the random number generator 122 as the initial value. When the PCR data is not included in the packet data thus selected, a further previous packet data is selected, until the packet data including the PCR data is encountered.

Thus, the XOR circuit 129 applies an XOR operation to the output stream of the data register 128 for the part of the stream having the packet data to be scrambled and the random numbers output from the random number generator 122. Thereby, the scrambling is achieved for the stream that includes the payload that is to be scrambled.

Thus, the location detection circuit 123 controls the selection control register 130 such that the scrambled output stream of the XOR circuit 129 is output continuously, until the outputting of the payload is finished. After this, the CPU 123 returns to the state for detecting the synchronization byte.

The output stream of the MPEG encoder 117 is thus converted to a scrambled stream in which the stream for the packet data is scrambled. The scrambled stream is then stored in the medium 131 and is forwarded further to the descrambling circuit 132 as necessary.

It should be noted that the stream supplied to the descrambling circuit 132 is stored in the buffer memory 133, while the stream thus stored in the buffer memory 133 is read out by the CPU 137.

The CPU 137 carries out a detection of the synchronization byte and carries out a discrimination, based upon the content of the scramble control information in the packet header, whether or not the stream for the payload is scrambled. When the stream for the payload is not scrambled, the CPU 137 returns to the state for detecting the synchronization byte.

On the contrary, when the stream for the payload is scrambled, the CPU 123 discriminates whether or not the adaptation field exists from the adaptation flag.

When it is confirmed that the adaptation field exists, the CPU 123 discriminates whether nor not there is a PCR from the PCR flag. When the PCR does not exist, the CPU 123 discriminates whether or not there is a payload from the payload flag.

When the PCR exists, the CPU 123 detects the location of the PCR and causes the data register 139 to hold the PCR data. Further, the CPU 123 discriminates whether or not there is a payload from the payload flag. When there is no payload, the CPU 123 process returns to the state for detecting the synchronization byte. When a payload exists, on the other hand, the CPU 137 takes a state for detecting the start location of the payload.

The CPU 137, upon detection of the start location of the payload, rewrites the selection control register 141, such that the PCR data held by the data register 139, in other words the PCR data in the payload to be descrambled, is supplied to the random number generator 136 as the initial value. When there is no PCR data in the packet header of the payload to be descrambled, the PCR data in the packet header of the payload immediately before the payload to be descrambled, is supplied to the random number generator 136 as the initial value. When there is no PCR data again in the packet header of the packet data, a further previous payload is selected, until a payload including the PCR data is encountered.

Thus, the XOR circuit 143 applies the XOR operation to the output stream of the data register 142 for the part of the payload to be descrambled and to the random numbers output from the random number generator 136. Thereby, the descrambling is achieved for the stream that includes the payload that is to be descrambled.

Thus, the CPU 137 controls the selection circuit 144 such that the scrambled output stream of the XOR circuit 143 is output continuously, until the stream for the packet data is finished. After this, the CPU 137 returns to the state for detecting the synchronization byte.

Thus, the stream read out from the medium 131 is converted to a descrambled stream by the descrambling circuit 132 such that the scrambled stream for the payload is descrambled. The descrambled stream is then supplied to the MPEG decoder 145.

Thus, in the data transmission system and method according to the fifth embodiment of the present invention, the output stream of the MPEG2-PS or MPEG2-TS format of the MPEG 117 is converted to the scrambled stream by the scrambling circuit 118 such that the stream for the packet data or the payload is scrambled. The scrambled stream is then supplied to the descrambling circuit 132 for descrambling via the medium 131. The stream thus descrambled is then transmitted to the MPEG decoder 145.

In the scrambling circuit 118, the scrambling is made by supplying the PTS data in the packet header of the packet data to be scrambled or the PCR data in the packet header of the payload to be scrambled, to the random number generator 122 as an initial value. When there is no PTS data in the packet header of the packet data to be scrambled, the PTS data in the packet header of the packet data immediately before the packet data to be scrambled, is supplied to the random number generator 122 as the initial value. When there is no PTS data again in the packet header of the packet data, a further previous packet data is selected, until a packet data including the PTS data is encountered. When there is no PCR data in the packet header of the payload to be scrambled, the PCR data in the packet header of the payload immediately before the payload to be scrambled, is supplied to the random number generator 122 as the initial value. When there is no PCR data again in the packet header of the payload, a further previous payload is selected, until a payload including the PCR data is encountered.

In the descrambling circuit 132, on the other hand, the descrambling is made by supplying, for each stream for the scrambled packet data or payload, the PTS data in the packet header of the packet data to be descrambled or the PCR data in the packet header of the payload to be descrambled, to the random number generator 136 as an initial value. When there is no PTS in the packet header of the packet data to be descrambled, the PTS data in the packet header of the packet data immediately before the packet data to be descrambled, is supplied to the random number generator 136 as the initial value. When there is no PTS data again in the packet header of the packet data, a further previous packet data is selected, until a packet data including the PTS data is encountered. When there is no PCR data in the packet header of the payload to be descrambled, the PCR data in the packet header of the payload immediately before the payload to be descrambled, is supplied to the random number generator 122 as the initial value. When there is no PCR data again in the packet header of the payload, a further previous payload is selected, until a payload including the PCT data is encountered.

According to the data transmission method and system of the fifth embodiment of the present invention, the random number generator 136 of the descrambling circuit 132 is supplied, for each stream for the packet data or the payload to be descrambled, with the PTS or PCR data of which the value is not constant. Thereby, analysis of the random number pattern generated by the random number generator 136 becomes difficult, and the security of the data transmission is improved substantially. Further, the transmission system of the present embodiment can be applied to both the MPEG2-PS system and the MPEG2-TS system.

In any of the foregoing embodiments, the predetermined non-fixed data to be supplied to the random number generator in the scrambling apparatus or descrambling apparatus is not limited to the PTS data or PCR data but may be formed by an operation on the PTS data or PCR data with other data such as the data included in the packet header. For example, the predetermined data may be formed by combining or applying the PTS data to the DTS data or the cyclic counter data in the MPEG2-PS format. Further, the predetermined data may be obtained by combining or applying the PCR data to the cyclic counter data.

Further, the present invention is not limited to the embodiments described heretofore, but various variations and modifications may be made without departing from the scope of the invention.

What is claimed is:

1. A scrambling method of an incoming stream including a series of unit streams in succession, the unit stream including a first stream part and a second stream part located behind the first stream part, said first stream part including predetermined data having a non-fixed value, the scrambling method scrambling the second stream part by using a random number generator, comprising a step of:

supplying, for each second stream part to be scrambled said, predetermined data included in the first stream part and having said non-fixed value to the random number generator as an initial value thereof.

2. The scrambling method as claimed in claim 1, wherein, when the predetermined data does not exist in the first stream part, data corresponding to the predetermined data in a stream part immediately before the first stream part is supplied to the random number generator as the initial value.

3. The scrambling method as claimed in claim 1, wherein the stream including the unit streams in succession is a stream prescribed by an MPEG standard, wherein the first stream part includes a stream forming a packet header and the second stream part includes a stream forming packet data, and wherein the predetermined data includes a presentation time stamp.

4. The scrambling method as claimed in claim 1, wherein the stream including the unit streams in succession is a stream prescribed by an MPEG standard, wherein the first stream part includes a stream forming a packet header and the second stream part includes a stream forming packet data, and wherein the predetermined data includes a program clock reference.

5. The scrambling method as claimed in claim 1, further comprising a parallel conversion step for converting a part of the stream formed of the unit streams into a plurality of streams, wherein the scrambling method is performed for each of the plurality of streams.

6. A scrambling apparatus supplied with a stream including a series of unit streams in succession, the unit stream including a first stream part and a second stream part located behind the first stream part, said first stream part including predetermined data having a non-fixed value, the scrambling apparatus scrambling the second stream part, the scrambling apparatus comprising:
- a random number generator for generating random numbers;
- an initial value supplying circuit supplying, for each second stream part to be scrambled, said predetermined non-fixed data included in the first stream part to the random number generator as an initial value thereof; and
- a logic operation circuit for applying a logic operation to the second stream part to be scrambled and the random numbers generated by the random number generator, for scrambling the second stream part.

7. The scrambling apparatus as claimed in claim 6, wherein the initial value supplying circuit supplies data corresponding to the predetermined non-fixed data in a stream part immediately before the first stream part to the random number generator as the initial value when the predetermined non-fixed data does not exist in the first stream part.

8. The scrambling apparatus as claimed in claim 6, wherein the stream including the unit streams in succession is a stream prescribed by an MPEG standard, wherein the first stream part includes a stream forming a packet header and the second stream part includes a stream forming packet data, and wherein the predetermined non-fixed data includes a presentation time stamp.

9. The scrambling apparatus as claimed in claim 6, wherein the stream including the unit streams in succession is a stream prescribed by an MPEG standard, wherein the first stream part includes a stream forming a packet header and the second stream part includes a stream forming packet data, and wherein the predetermined non-fixed data includes a program clock reference.

10. The scrambling apparatus as claimed in claim 6, wherein the initial value supplying circuit further comprises:
- a location detection circuit for detecting a location of the predetermined non-fixed data and a start location of the second stream part; and
- a data hold circuit for holding the predetermined non-fixed data, wherein the data hold circuit holds the predetermined non-fixed data when the location detection circuit detects the location of the predetermined non-fixed data.

11. The scrambling apparatus as claimed in claim 6, further comprising:
- a serial-to-parallel converter for converting the stream into a plurality of streams, wherein the random number generator, the initial value supplying circuit and the logic operation circuit scramble each of the plurality of streams to produce a plurality of scrambled streams; and
- a parallel-to-serial converter for converting the plurality of scrambled streams into a single scrambled stream.

12. The scrambling apparatus as claimed in claim 10, the location detection circuit further comprising a microprocessor and a program memory for storing a control program of the microprocessor, such that the location detection circuit arbitrarily selects the stream from a plurality of streams of different formats and scrambles the stream.

13. A descrambling method of an incoming stream including a series of unit streams in succession, the unit stream including a first stream part and a second stream part located behind the first stream part, said first stream part including predetermined data having a non-fixed value, the descrambling method descrambling the second stream part by using a random number generator, the descrambling method comprising a step of:
- supplying, for each second stream part to be descrambled, said predetermined non-fixed data included in the first stream part to the random number generator as an initial value thereof, for descrambling the second stream part.

14. The descrambling method as claimed in claim 13, wherein, when the predetermined non-fixed data does not exist in the first stream part, data corresponding to the predetermined non-fixed data in a stream part immediately before the first stream part is supplied to the random number generator as the initial value.

15. The descrambling method as claimed in claim 13, wherein the stream including the unit streams in succession is a stream prescribed by an MPEG standard, wherein the first stream part includes a stream forming a packet header and the second stream part includes a stream forming packet data, and wherein the predetermined non-fixed data includes a presentation time stamp.

16. The descrambling method as claimed in claim 13, wherein the stream including the unit streams in succession is a stream prescribed by an MPEG standard, wherein the first stream part includes a stream forming a packet header and the second stream part includes a stream forming packet data, and wherein the predetermined non-fixed data includes a program clock reference.

17. The descrambling method as claimed in claim 13, further comprising a parallel conversion step for converting a part of the stream formed of the unit streams into a plurality of streams, wherein the scrambling method is performed for each of the plurality of streams.

18. A descrambling apparatus supplied with a stream including a series of unit streams in succession, the unit stream including a first stream part and a second stream part located behind the first stream part, said first stream part including predetermined data having a non-fixed value, the descrambling apparatus comprising:
- a random number generator for generating random numbers;

an initial value supplying circuit for supplying, for each second stream part to be descrambled, said predetermined non-fixed data included in the first stream part, to the random number generator as an initial value thereof; and a logic operation circuit applying a logic operation to the second stream part and the random numbers generated by the random number generator, to descramble the second stream part.

19. The descrambling apparatus as claimed in claim 18, wherein the initial value supplying circuit supplies, when the predetermined non-fixed data does not exist in the first stream part, data corresponding to the predetermined non-fixed data in a stream part immediately before the first stream part to the random number generator as the initial value.

20. The descrambling apparatus as claimed in claim 18, wherein the stream including the unit streams in succession is a stream prescribed by an MPEG standard, wherein the first stream part includes a stream forming a packet header and the second stream part includes a stream forming packet data, and wherein the predetermined non-fixed data includes a presentation time stamp.

21. The descrambling apparatus as claimed in claim 18, wherein the stream including the unit streams in succession is a stream prescribed by an MPEG standard, wherein the first stream part includes stream forming a packet header and the second stream part includes a stream forming packet data, and wherein the predetermined non-fixed data includes a program clock reference.

22. The descrambling apparatus as claimed in claim 18, the initial value supplying circuit further comprising:

a location detection circuit for detecting a location of the predetermined non-fixed data and a start location of the second stream part; and a data hold circuit for holding the predetermined non-fixed data, wherein the data hold circuit holds the predetermined non-fixed data when the location detection circuit detects the location of the predetermined non-fixed data.

23. The descrambling apparatus as claimed in claim 18, further comprising:

a serial-to-parallel converter for converting the stream into a plurality of streams, wherein the random number generator, the initial value supplying circuit and the logic operation circuit descramble each of the plurality of streams to produce a plurality of descrambled streams; and a parallel-to-serial converter for converting the plurality of descrambled streams into a single descrambled stream.

24. The descrambling apparatus as claimed in claim 22, the location detection circuit further comprising a microprocessor and a program memory for storing a control program of the microprocessor, such that the location detection circuit arbitrarily selects the stream from a plurality of streams of different formats and descrambles the stream.

25. The descrambling apparatus as claimed in claim 18, wherein the descrambling apparatus forms an IC card including a memory circuit for storing personal identification data, the IC card being adapted for detachable mounting upon an external apparatus, and wherein the descrambling apparatus allows an activation of the random number generator only when the personal identification data of the IC card is accepted by the external apparatus.

26. A data transmission method, including the steps of:

applying a scrambling method to an incoming stream including a series of unit streams in succession, the unit stream including a first stream part and a second stream part located behind the first stream part, said first stream part including predetermined data having a non-fixed value, the scrambling method including a step of supplying said predetermined data included in the first stream part and having said non-fixed value, for each second stream part to be scrambled, to a random number generator as an initial value;

transmitting the stream scrambled in the scrambling step via a medium to a destination; and applying a descrambling method, in the destination, to the stream transmitted via the medium, the descrambling method comprising a step of supplying, for each second stream part, said predetermined non-fixed data included in the first stream part to a random number generator as an initial value, for descrambling the second stream part.

27. A data transmission system for transmitting a stream supplied thereto and including a series of unit streams in succession, the unit stream including a first stream part and a second stream part located behind the first stream part, said first stream part including predetermined non-fixed data, said data transmission system comprising:

a transmission source including a scrambling apparatus, the scrambling apparatus comprising: a random number generator for generating random numbers; an initial value supplying circuit for supplying, for each second stream part to be scrambled, said predetermined non-fixed data included in the first stream part to the random number generator as an initial value thereof; and a logic operation circuit for applying a logic operation to the second stream part and the random numbers generated by the random number generator, for scrambling the second stream part, the transmission source supplying a scrambled stream produced by the scrambling apparatus upon a medium; and a destination including a descrambling apparatus for descrambling the scrambled stream supplied to the destination via the medium, the descrambling apparatus comprising: a random number generator for generating random numbers; an initial value supplying circuit for supplying, for each scrambled second stream part included in the scrambled stream, said predetermined non-fixed data value included in the first stream part of the scrambled stream, to the random number generator as an initial value thereof; and a logic operation circuit for applying a logic operation to the scrambled second stream part and the random numbers generated by the random number generator, to descramble the second stream part.

* * * * *

UNITED STATES PATENT AND TRADEMARK OFFICE
CERTIFICATE OF CORRECTION

PATENT NO. : 5,787,179
DATED : July 28, 1998
INVENTOR(S) : Kiyotaka OGAWA et al.

It is certified that error appears in the above-indentified patent and that said Letters Patent is hereby corrected as shown below:

Col. 3, line 35, change "descrambling" to --descrambles--. (second occurrence)

Col. 13, line 32, delete "the" (first occurrence);
line 48, delete "the" (first occurrence).

Col. 14, line 9, delete "the" (second occurrence);
line 40, delete "the" (first occurrence);
line 55, delete "the" (first and second occurrences);
line 58, delete "the" (second occurrence).

Col. 15, line 38, delete "of" (second occurrence).

Signed and Sealed this

Fifth Day of January, 1999

Attest:

Attesting Officer

*Acting Commissioner of Patents and Trademarks*